US008924661B1

United States Patent
Shachar et al.

(10) Patent No.: US 8,924,661 B1
(45) Date of Patent: Dec. 30, 2014

(54) MEMORY SYSTEM INCLUDING A CONTROLLER AND PROCESSORS ASSOCIATED WITH MEMORY DEVICES

(75) Inventors: Michael Shachar, Caesarea (IL); Barak Rotbard, Tel Aviv (IL); Oren Golov, Hod Hasharon (IL); Uri Perlmutter, Ra'anana (IL); Dotan Sokolov, Ra'anana (IL); Julian Vlaiko, Kfar Saba (IL); Yair Schwartz, Yokneam Ilit (IL)

(73) Assignee: Apple Inc., Cupertino, CA (US)

( * ) Notice: Subject to any disclaimer, the term of this patent is extended or adjusted under 35 U.S.C. 154(b) by 673 days.

(21) Appl. No.: 12/688,883

(22) Filed: Jan. 17, 2010

Related U.S. Application Data

(60) Provisional application No. 61/145,562, filed on Jan. 18, 2009, provisional application No. 61/163,133, filed on Mar. 25, 2009, provisional application No. 61/163,138, filed on Mar. 25, 2009, provisional application No. 61/294,498, filed on Jan. 13, 2010.

(51) Int. Cl.
| | |
|---|---|
| *G06F 13/00* | (2006.01) |
| *G06F 12/06* | (2006.01) |
| *G06F 3/06* | (2006.01) |
| *G06F 13/18* | (2006.01) |
| *G06F 13/16* | (2006.01) |

(52) U.S. Cl.
CPC .......... *G06F 12/0638* (2013.01); *G06F 3/0683* (2013.01); *G06F 3/0628* (2013.01); *G06F 13/18* (2013.01); *G06F 13/1668* (2013.01); *G06F 13/16577* (2013.01)
USPC ............. 711/158; 711/151; 710/40; 710/244; 712/23; 712/215; 365/45; 365/189.2; 365/239

(58) Field of Classification Search
CPC . G06F 3/0628; G06F 3/0683; G06F 12/0638; G06F 13/1657; G06F 13/1668; G06F 13/18
USPC .................... 711/103, 149, 154; 710/40, 244; 712/25, 215; 365/45, 189.2, 239
See application file for complete search history.

(56) References Cited

U.S. PATENT DOCUMENTS

| | | | |
|---|---|---|---|
| 3,668,631 | A | 6/1972 | Griffith et al. |
| 3,668,632 | A | 6/1972 | Oldham |

(Continued)

FOREIGN PATENT DOCUMENTS

| | | |
|---|---|---|
| EP | 0783754 B1 | 7/1997 |
| EP | 1434236 B1 | 6/2004 |

(Continued)

OTHER PUBLICATIONS

Jedec Standard JESD84-C44, "Embedded MultiMediaCard (e•MMC) Mechanical Standard, with Optional Reset Signal", Jedec Solid State Technology Association, USA, Jul. 2009.

(Continued)

*Primary Examiner* — Reba I Elmore
(74) *Attorney, Agent, or Firm* — Meyertons, Hood, Kivlin, Kowert & Goetzel, P.C.

(57) ABSTRACT

A data storage system includes a plurality of non-volatile memory devices arranged in one or more sets, a main controller and one or more processors. The main controller is configured to accept commands from a host and to convert the commands into recipes. Each recipe includes a list of multiple memory operations to be performed sequentially in the non-volatile memory devices belonging to one of the sets. Each of the processors is associated with a respective set of the non-volatile memory devices, and is configured to receive one or more of the recipes from the main controller and to execute the memory operations specified in the received recipes in the non-volatile memory devices belonging to the respective set.

34 Claims, 3 Drawing Sheets

(56) References Cited

U.S. PATENT DOCUMENTS

| | | |
|---|---|---|
| 4,058,851 A | 11/1977 | Scheuneman |
| 4,112,502 A | 9/1978 | Scheuneman |
| 4,394,763 A | 7/1983 | Nagano et al. |
| 4,413,339 A | 11/1983 | Riggle et al. |
| 4,556,961 A | 12/1985 | Iwahashi et al. |
| 4,558,431 A | 12/1985 | Satoh |
| 4,608,687 A | 8/1986 | Dutton |
| 4,654,847 A | 3/1987 | Dutton |
| 4,661,929 A | 4/1987 | Aoki et al. |
| 4,768,171 A | 8/1988 | Tada |
| 4,811,285 A | 3/1989 | Walker et al. |
| 4,899,342 A | 2/1990 | Potter et al. |
| 4,910,706 A | 3/1990 | Hyatt |
| 4,993,029 A | 2/1991 | Galbraith et al. |
| 5,056,089 A | 10/1991 | Furuta et al. |
| 5,077,722 A | 12/1991 | Geist et al. |
| 5,126,808 A | 6/1992 | Montalvo et al. |
| 5,163,021 A | 11/1992 | Mehrotra et al. |
| 5,172,338 A | 12/1992 | Mehrotra et al. |
| 5,182,558 A | 1/1993 | Mayo |
| 5,182,752 A | 1/1993 | DeRoo et al. |
| 5,191,584 A | 3/1993 | Anderson |
| 5,200,959 A | 4/1993 | Gross et al. |
| 5,237,535 A | 8/1993 | Mielke et al. |
| 5,272,669 A | 12/1993 | Samachisa et al. |
| 5,276,649 A | 1/1994 | Hoshita et al. |
| 5,287,469 A | 2/1994 | Tsuboi |
| 5,365,484 A | 11/1994 | Cleveland et al. |
| 5,388,064 A | 2/1995 | Khan |
| 5,416,646 A | 5/1995 | Shirai |
| 5,416,782 A | 5/1995 | Wells et al. |
| 5,446,854 A | 8/1995 | Khalidi et al. |
| 5,450,424 A | 9/1995 | Okugaki et al. |
| 5,469,444 A | 11/1995 | Endoh et al. |
| 5,473,753 A | 12/1995 | Wells et al. |
| 5,479,170 A | 12/1995 | Cauwenberghs et al. |
| 5,508,958 A | 4/1996 | Fazio et al. |
| 5,519,831 A | 5/1996 | Holzhammer |
| 5,532,962 A | 7/1996 | Auclair et al. |
| 5,533,190 A | 7/1996 | Binford et al. |
| 5,541,886 A | 7/1996 | Hasbun |
| 5,600,677 A | 2/1997 | Citta et al. |
| 5,638,320 A | 6/1997 | Wong et al. |
| 5,657,332 A | 8/1997 | Auclair et al. |
| 5,675,540 A | 10/1997 | Roohparvar |
| 5,682,352 A | 10/1997 | Wong et al. |
| 5,687,114 A | 11/1997 | Khan |
| 5,696,717 A | 12/1997 | Koh |
| 5,726,649 A | 3/1998 | Tamaru et al. |
| 5,726,934 A | 3/1998 | Tran et al. |
| 5,742,752 A | 4/1998 | De Koening |
| 5,748,533 A | 5/1998 | Dunlap et al. |
| 5,748,534 A | 5/1998 | Dunlap et al. |
| 5,751,637 A | 5/1998 | Chen et al. |
| 5,761,402 A | 6/1998 | Kaneda et al. |
| 5,798,966 A | 8/1998 | Keeney |
| 5,799,200 A | 8/1998 | Brant et al. |
| 5,801,985 A | 9/1998 | Roohparvar et al. |
| 5,838,832 A | 11/1998 | Barnsley |
| 5,860,106 A | 1/1999 | Domen et al. |
| 5,867,114 A | 2/1999 | Barbir |
| 5,867,428 A | 2/1999 | Ishii et al. |
| 5,867,429 A | 2/1999 | Chen et al. |
| 5,877,986 A | 3/1999 | Harari et al. |
| 5,889,937 A | 3/1999 | Tamagawa |
| 5,901,089 A | 5/1999 | Korsh et al. |
| 5,909,449 A | 6/1999 | So et al. |
| 5,912,906 A | 6/1999 | Wu et al. |
| 5,930,167 A | 7/1999 | Lee et al. |
| 5,937,424 A | 8/1999 | Leak et al. |
| 5,942,004 A | 8/1999 | Cappelletti |
| 5,946,716 A | 8/1999 | Karp et al. |
| 5,956,743 A * | 9/1999 | Bruce et al. .................. 711/103 |
| 5,969,986 A | 10/1999 | Wong et al. |
| 5,982,668 A | 11/1999 | Ishii et al. |
| 5,991,517 A | 11/1999 | Harari et al. |
| 5,995,417 A | 11/1999 | Chen et al. |
| 6,009,014 A | 12/1999 | Hollmer et al. |
| 6,009,016 A | 12/1999 | Ishii et al. |
| 6,023,425 A | 2/2000 | Ishii et al. |
| 6,034,891 A | 3/2000 | Norman |
| 6,040,993 A | 3/2000 | Chen et al. |
| 6,041,430 A | 3/2000 | Yamauchi |
| 6,073,204 A | 6/2000 | Lakhani et al. |
| 6,101,614 A | 8/2000 | Gonzales et al. |
| 6,128,237 A | 10/2000 | Shirley et al. |
| 6,134,140 A | 10/2000 | Tanaka et al. |
| 6,134,143 A | 10/2000 | Norman |
| 6,134,631 A | 10/2000 | Jennings |
| 6,141,261 A | 10/2000 | Patti |
| 6,151,246 A | 11/2000 | So et al. |
| 6,157,573 A | 12/2000 | Ishii et al. |
| 6,166,962 A | 12/2000 | Chen et al. |
| 6,169,691 B1 | 1/2001 | Pasotti et al. |
| 6,178,466 B1 | 1/2001 | Gilbertson et al. |
| 6,185,134 B1 | 2/2001 | Tanaka et al. |
| 6,209,113 B1 | 3/2001 | Roohparvar |
| 6,212,654 B1 | 4/2001 | Lou et al. |
| 6,219,276 B1 | 4/2001 | Parker |
| 6,219,447 B1 | 4/2001 | Lee et al. |
| 6,222,762 B1 | 4/2001 | Guterman et al. |
| 6,230,233 B1 | 5/2001 | Lofgren et al. |
| 6,240,458 B1 | 5/2001 | Gilbertson |
| 6,259,627 B1 | 7/2001 | Wong |
| 6,275,419 B1 | 8/2001 | Guterman et al. |
| 6,278,632 B1 | 8/2001 | Chevallier |
| 6,279,069 B1 | 8/2001 | Robinson et al. |
| 6,288,944 B1 | 9/2001 | Kawamura |
| 6,292,394 B1 | 9/2001 | Cohen et al. |
| 6,301,151 B1 | 10/2001 | Engh et al. |
| 6,304,486 B1 | 10/2001 | Yano |
| 6,307,776 B1 | 10/2001 | So et al. |
| 6,314,044 B1 | 11/2001 | Sasaki et al. |
| 6,317,363 B1 | 11/2001 | Guterman et al. |
| 6,317,364 B1 | 11/2001 | Guterman et al. |
| 6,345,004 B1 | 2/2002 | Omura et al. |
| 6,360,346 B1 | 3/2002 | Miyauchi et al. |
| 6,363,008 B1 | 3/2002 | Wong |
| 6,363,454 B1 | 3/2002 | Lakhani et al. |
| 6,366,496 B1 | 4/2002 | Torelli et al. |
| 6,385,092 B1 | 5/2002 | Ishii et al. |
| 6,392,932 B1 | 5/2002 | Ishii et al. |
| 6,396,742 B1 | 5/2002 | Korsh et al. |
| 6,397,364 B1 | 5/2002 | Barkan |
| 6,405,323 B1 | 6/2002 | Lin et al. |
| 6,405,342 B1 | 6/2002 | Lee |
| 6,418,060 B1 | 7/2002 | Yang et al. |
| 6,442,585 B1 | 8/2002 | Dean et al. |
| 6,445,602 B1 | 9/2002 | Kokudo et al. |
| 6,452,838 B1 | 9/2002 | Ishii et al. |
| 6,456,528 B1 | 9/2002 | Chen |
| 6,466,476 B1 | 10/2002 | Wong et al. |
| 6,467,062 B1 | 10/2002 | Barkan |
| 6,469,931 B1 | 10/2002 | Ban et al. |
| 6,480,948 B1 | 11/2002 | Virajpet et al. |
| 6,490,236 B1 | 12/2002 | Fukuda et al. |
| 6,522,580 B2 | 2/2003 | Chen et al. |
| 6,525,952 B2 | 2/2003 | Araki et al. |
| 6,532,556 B1 | 3/2003 | Wong et al. |
| 6,538,922 B1 | 3/2003 | Khalid et al. |
| 6,549,464 B2 | 4/2003 | Tanaka et al. |
| 6,553,510 B1 | 4/2003 | Pekny |
| 6,558,967 B1 | 5/2003 | Wong |
| 6,560,152 B1 | 5/2003 | Cernea |
| 6,567,311 B2 | 5/2003 | Ishii et al. |
| 6,577,539 B2 | 6/2003 | Iwahashi |
| 6,584,012 B2 | 6/2003 | Banks |
| 6,615,307 B1 | 9/2003 | Roohparvar |
| 6,621,739 B2 | 9/2003 | Gonzalez et al. |
| 6,640,326 B1 | 10/2003 | Buckingham et al. |
| 6,643,169 B2 | 11/2003 | Rudelic et al. |
| 6,646,913 B2 | 11/2003 | Micheloni et al. |
| 6,678,192 B2 | 1/2004 | Gongwer et al. |
| 6,683,811 B2 | 1/2004 | Ishii et al. |

(56) References Cited

U.S. PATENT DOCUMENTS

| | | |
|---|---|---|
| 6,687,155 B2 | 2/2004 | Nagasue |
| 6,707,748 B2 | 3/2004 | Lin et al. |
| 6,708,257 B2 | 3/2004 | Bao |
| 6,714,449 B2 | 3/2004 | Khalid |
| 6,717,847 B2 | 4/2004 | Chen |
| 6,725,321 B1 * | 4/2004 | Sinclair et al. ............... 711/103 |
| 6,731,557 B2 | 5/2004 | Beretta |
| 6,732,250 B2 | 5/2004 | Durrant |
| 6,738,293 B1 | 5/2004 | Iwahashi |
| 6,751,766 B2 | 6/2004 | Guterman et al. |
| 6,757,193 B2 | 6/2004 | Chen et al. |
| 6,774,808 B1 | 8/2004 | Hibbs et al. |
| 6,781,877 B2 | 8/2004 | Cernea et al. |
| 6,804,805 B2 | 10/2004 | Rub |
| 6,807,095 B2 | 10/2004 | Chen et al. |
| 6,807,101 B2 | 10/2004 | Ooishi et al. |
| 6,809,964 B2 | 10/2004 | Moschopoulos et al. |
| 6,819,592 B2 | 11/2004 | Noguchi et al. |
| 6,829,167 B2 | 12/2004 | Tu et al. |
| 6,845,052 B1 | 1/2005 | Ho et al. |
| 6,851,018 B2 | 2/2005 | Wyatt et al. |
| 6,851,081 B2 | 2/2005 | Yamamoto |
| 6,856,546 B2 | 2/2005 | Guterman et al. |
| 6,862,218 B2 | 3/2005 | Guterman et al. |
| 6,870,767 B2 | 3/2005 | Rudelic et al. |
| 6,870,773 B2 | 3/2005 | Noguchi et al. |
| 6,873,552 B2 | 3/2005 | Ishii et al. |
| 6,879,520 B2 | 4/2005 | Hosono et al. |
| 6,882,567 B1 | 4/2005 | Wong |
| 6,894,926 B2 | 5/2005 | Guterman et al. |
| 6,907,497 B2 | 6/2005 | Hosono et al. |
| 6,925,009 B2 | 8/2005 | Noguchi et al. |
| 6,930,925 B2 | 8/2005 | Guo et al. |
| 6,934,188 B2 | 8/2005 | Roohparvar |
| 6,937,511 B2 | 8/2005 | Hsu et al. |
| 6,958,938 B2 | 10/2005 | Noguchi et al. |
| 6,963,505 B2 | 11/2005 | Cohen |
| 6,972,993 B2 | 12/2005 | Conley et al. |
| 6,988,175 B2 | 1/2006 | Lasser |
| 6,992,932 B2 | 1/2006 | Cohen |
| 6,999,344 B2 | 2/2006 | Hosono et al. |
| 7,002,843 B2 | 2/2006 | Guterman et al. |
| 7,006,379 B2 | 2/2006 | Noguchi et al. |
| 7,012,835 B2 | 3/2006 | Gonzalez et al. |
| 7,020,017 B2 | 3/2006 | Chen et al. |
| 7,023,735 B2 | 4/2006 | Ban et al. |
| 7,031,210 B2 | 4/2006 | Park et al. |
| 7,031,214 B2 | 4/2006 | Tran |
| 7,031,216 B2 | 4/2006 | You |
| 7,039,846 B2 | 5/2006 | Hewitt et al. |
| 7,042,766 B1 | 5/2006 | Wang et al. |
| 7,054,193 B1 | 5/2006 | Wong |
| 7,054,199 B2 | 5/2006 | Lee et al. |
| 7,057,958 B2 | 6/2006 | So et al. |
| 7,065,147 B2 | 6/2006 | Ophir et al. |
| 7,068,539 B2 | 6/2006 | Guterman et al. |
| 7,071,849 B2 | 7/2006 | Zhang |
| 7,072,222 B2 | 7/2006 | Ishii et al. |
| 7,079,555 B2 | 7/2006 | Baydar et al. |
| 7,088,615 B2 | 8/2006 | Guterman et al. |
| 7,099,194 B2 | 8/2006 | Tu et al. |
| 7,102,924 B2 | 9/2006 | Chen et al. |
| 7,113,432 B2 | 9/2006 | Mokhlesi |
| 7,130,210 B2 | 10/2006 | Bathul et al. |
| 7,139,192 B1 | 11/2006 | Wong |
| 7,139,198 B2 | 11/2006 | Guterman et al. |
| 7,145,805 B2 | 12/2006 | Ishii et al. |
| 7,151,692 B2 | 12/2006 | Wu |
| 7,158,058 B1 | 1/2007 | Yu |
| 7,161,836 | 1/2007 | Wan et al. |
| 7,170,781 B2 | 1/2007 | So et al. |
| 7,170,802 B2 | 1/2007 | Cernea et al. |
| 7,173,859 B2 | 2/2007 | Hemink |
| 7,177,184 B2 | 2/2007 | Chen |
| 7,177,195 B2 | 2/2007 | Gonzalez et al. |
| 7,177,199 B2 | 2/2007 | Chen et al. |
| 7,177,200 B2 | 2/2007 | Ronen et al. |
| 7,184,338 B2 | 2/2007 | Nagakawa et al. |
| 7,187,195 B2 | 3/2007 | Kim |
| 7,187,592 B2 | 3/2007 | Guterman et al. |
| 7,190,614 B2 | 3/2007 | Wu |
| 7,193,898 B2 | 3/2007 | Cernea |
| 7,193,921 B2 | 3/2007 | Choi et al. |
| 7,196,644 B1 | 3/2007 | Anderson et al. |
| 7,196,928 B2 | 3/2007 | Chen |
| 7,196,933 B2 | 3/2007 | Shibata |
| 7,197,594 B2 | 3/2007 | Raz et al. |
| 7,200,062 B2 | 4/2007 | Kinsely et al. |
| 7,210,077 B2 | 4/2007 | Brandenberger et al. |
| 7,221,592 B2 | 5/2007 | Nazarian |
| 7,224,613 B2 | 5/2007 | Chen et al. |
| 7,231,474 B1 | 6/2007 | Helms et al. |
| 7,231,562 B2 | 6/2007 | Ohlhoff et al. |
| 7,243,275 B2 | 7/2007 | Gongwer et al. |
| 7,254,690 B2 | 8/2007 | Rao |
| 7,254,763 B2 | 8/2007 | Aadsen et al. |
| 7,257,027 B2 | 8/2007 | Park |
| 7,259,987 B2 | 8/2007 | Chen et al. |
| 7,266,026 B2 | 9/2007 | Gongwer et al. |
| 7,266,069 B2 | 9/2007 | Chu |
| 7,269,066 B2 | 9/2007 | Nguyen et al. |
| 7,272,757 B2 | 9/2007 | Stocken |
| 7,274,611 B2 | 9/2007 | Roohparvar |
| 7,277,355 B2 | 10/2007 | Tanzana |
| 7,280,398 B1 | 10/2007 | Lee et al. |
| 7,280,409 B2 | 10/2007 | Misumi et al. |
| 7,280,415 B2 | 10/2007 | Hwang et al. |
| 7,283,399 B2 | 10/2007 | Ishii et al. |
| 7,289,344 B2 | 10/2007 | Chen |
| 7,301,807 B2 | 11/2007 | Khalid et al. |
| 7,301,817 B2 | 11/2007 | Li et al. |
| 7,308,525 B2 | 12/2007 | Lasser et al. |
| 7,310,255 B2 | 12/2007 | Chan |
| 7,310,269 B2 | 12/2007 | Shibata |
| 7,310,271 B2 | 12/2007 | Lee |
| 7,310,272 B1 | 12/2007 | Mokhesi et al. |
| 7,310,347 B2 | 12/2007 | Lasser |
| 7,312,727 B1 | 12/2007 | Feng et al. |
| 7,321,509 B2 | 1/2008 | Chen et al. |
| 7,328,384 B1 | 2/2008 | Kulkarni et al. |
| 7,342,831 B2 | 3/2008 | Mokhlesi et al. |
| 7,343,330 B1 | 3/2008 | Boesjes et al. |
| 7,345,924 B2 | 3/2008 | Nguyen et al. |
| 7,345,928 B2 | 3/2008 | Li |
| 7,349,263 B2 | 3/2008 | Kim et al. |
| 7,356,755 B2 | 4/2008 | Fackenthal |
| 7,363,420 B2 | 4/2008 | Lin et al. |
| 7,365,671 B1 | 4/2008 | Anderson |
| 7,373,452 B2 * | 5/2008 | Suh ............................. 711/103 |
| 7,388,781 B2 | 6/2008 | Litsyn et al. |
| 7,397,697 B2 | 7/2008 | So et al. |
| 7,405,974 B2 | 7/2008 | Yaoi et al. |
| 7,405,979 B2 | 7/2008 | Ishii et al. |
| 7,408,804 B2 | 8/2008 | Hemink et al. |
| 7,408,810 B2 | 8/2008 | Aritome et al. |
| 7,409,473 B2 | 8/2008 | Conley et al. |
| 7,409,623 B2 | 8/2008 | Baker et al. |
| 7,420,847 B2 | 9/2008 | Li |
| 7,433,231 B2 | 10/2008 | Aritome |
| 7,433,697 B2 | 10/2008 | Karaoguz et al. |
| 7,434,111 B2 | 10/2008 | Sugiura et al. |
| 7,437,498 B2 | 10/2008 | Ronen |
| 7,440,324 B2 | 10/2008 | Mokhlesi |
| 7,440,331 B2 | 10/2008 | Hemink |
| 7,441,067 B2 | 10/2008 | Gorobetz et al. |
| 7,447,970 B2 | 11/2008 | Wu et al. |
| 7,450,421 B2 | 11/2008 | Mokhlesi et al. |
| 7,453,737 B2 | 11/2008 | Ha |
| 7,457,163 B2 | 11/2008 | Hemink |
| 7,457,897 B1 | 11/2008 | Lee et al. |
| 7,460,410 B2 | 12/2008 | Nagai et al. |
| 7,460,412 B2 | 12/2008 | Lee et al. |
| 7,466,592 B2 | 12/2008 | Mitani et al. |
| 7,468,907 B2 | 12/2008 | Kang et al. |

(56) References Cited

U.S. PATENT DOCUMENTS

| | | |
|---|---|---|
| 7,468,911 B2 | 12/2008 | Lutze et al. |
| 7,469,049 B1 | 12/2008 | Feng |
| 7,471,581 B2 | 12/2008 | Tran et al. |
| 7,483,319 B2 | 1/2009 | Brown |
| 7,487,329 B2 | 2/2009 | Hepkin et al. |
| 7,487,394 B2 | 2/2009 | Forhan et al. |
| 7,492,641 B2 | 2/2009 | Hosono et al. |
| 7,508,710 B2 | 3/2009 | Mokhlesi |
| 7,526,711 B2 | 4/2009 | Orio |
| 7,539,061 B2 | 5/2009 | Lee |
| 7,539,062 B2 | 5/2009 | Doyle |
| 7,551,492 B2 | 6/2009 | Kim |
| 7,558,109 B2 | 7/2009 | Brandman et al. |
| 7,558,839 B1 | 7/2009 | McGovern |
| 7,568,135 B2 | 7/2009 | Cornwell et al. |
| 7,570,520 B2 | 8/2009 | Kamei et al. |
| 7,574,555 B2 | 8/2009 | Porat et al. |
| 7,590,002 B2 | 9/2009 | Mokhlesi et al. |
| 7,593,259 B2 | 9/2009 | Kim |
| 7,594,093 B1 | 9/2009 | Kancherla |
| 7,596,707 B1 | 9/2009 | Vemula |
| 7,609,787 B2 | 10/2009 | Jahan et al. |
| 7,613,043 B2 | 11/2009 | Cornwell et al. |
| 7,616,498 B2 | 11/2009 | Mokhlesi et al. |
| 7,619,918 B2 | 11/2009 | Aritome |
| 7,631,245 B2 | 12/2009 | Lasser |
| 7,633,798 B2 | 12/2009 | Sarin et al. |
| 7,633,802 B2 | 12/2009 | Mokhlesi |
| 7,639,532 B2 | 12/2009 | Roohparvar et al. |
| 7,644,347 B2 | 1/2010 | Alexander et al. |
| 7,652,922 B2 * | 1/2010 | Kim et al. ............... 365/185.11 |
| 7,656,734 B2 | 2/2010 | Thorp et al. |
| 7,660,158 B2 | 2/2010 | Aritome |
| 7,660,183 B2 | 2/2010 | Ware et al. |
| 7,661,000 B2 | 2/2010 | Ueda et al. |
| 7,661,054 B2 | 2/2010 | Huffman et al. |
| 7,665,007 B2 | 2/2010 | Yang et al. |
| 7,680,987 B1 | 3/2010 | Clark et al. |
| 7,733,712 B1 | 6/2010 | Walston et al. |
| 7,742,351 B2 | 6/2010 | Inoue et al. |
| 7,761,624 B2 | 7/2010 | Karamcheti et al. |
| 7,797,609 B2 | 9/2010 | Neuman |
| 7,810,017 B2 | 10/2010 | Radke |
| 7,848,149 B2 | 12/2010 | Gonzalez et al. |
| 7,869,273 B2 | 1/2011 | Lee et al. |
| 7,885,119 B2 | 2/2011 | Li |
| 7,904,783 B2 | 3/2011 | Brandman et al. |
| 7,928,497 B2 | 4/2011 | Yaegashi |
| 7,929,549 B1 | 4/2011 | Talbot |
| 7,930,515 B2 | 4/2011 | Gupta et al. |
| 7,945,825 B2 | 5/2011 | Cohen et al. |
| 7,978,516 B2 | 7/2011 | Olbrich et al. |
| 8,014,094 B1 | 9/2011 | Jin |
| 8,037,380 B2 | 10/2011 | Cagno et al. |
| 8,040,744 B2 | 10/2011 | Gorobets et al. |
| 8,065,583 B2 | 11/2011 | Radke |
| 2001/0002172 A1 | 5/2001 | Tanaka et al. |
| 2001/0006479 A1 | 7/2001 | Ikehashi et al. |
| 2002/0038440 A1 | 3/2002 | Barkan |
| 2002/0056064 A1 | 5/2002 | Kidorf et al. |
| 2002/0118574 A1 | 8/2002 | Gongwer et al. |
| 2002/0133684 A1 | 9/2002 | Anderson |
| 2002/0166091 A1 | 11/2002 | Kidorf et al. |
| 2002/0174295 A1 | 11/2002 | Ulrich et al. |
| 2002/0196510 A1 | 12/2002 | Hietala et al. |
| 2003/0002348 A1 | 1/2003 | Chen et al. |
| 2003/0103400 A1 | 6/2003 | Van Tran |
| 2003/0161183 A1 | 8/2003 | Van Tran |
| 2003/0189856 A1 | 10/2003 | Cho et al. |
| 2004/0057265 A1 | 3/2004 | Mirabel et al. |
| 2004/0057285 A1 | 3/2004 | Cernea et al. |
| 2004/0083333 A1 | 4/2004 | Chang et al. |
| 2004/0083334 A1 | 4/2004 | Chang et al. |
| 2004/0105311 A1 | 6/2004 | Cernea et al. |
| 2004/0114437 A1 | 6/2004 | Li |
| 2004/0160842 A1 | 8/2004 | Fukiage |
| 2004/0223371 A1 | 11/2004 | Roohparvar |
| 2005/0007802 A1 | 1/2005 | Gerpheide |
| 2005/0013165 A1 | 1/2005 | Ban |
| 2005/0024941 A1 | 2/2005 | Lasser et al. |
| 2005/0024978 A1 | 2/2005 | Ronen |
| 2005/0030788 A1 | 2/2005 | Parkinson et al. |
| 2005/0086574 A1 | 4/2005 | Fackenthal |
| 2005/0121436 A1 | 6/2005 | Kamitani et al. |
| 2005/0144361 A1 | 6/2005 | Gonzalez et al. |
| 2005/0157555 A1 | 7/2005 | Ono et al. |
| 2005/0162913 A1 | 7/2005 | Chen |
| 2005/0169051 A1 | 8/2005 | Khalid et al. |
| 2005/0189649 A1 | 9/2005 | Maruyama et al. |
| 2005/0213393 A1 | 9/2005 | Lasser |
| 2005/0224853 A1 | 10/2005 | Ohkawa |
| 2005/0240745 A1 | 10/2005 | Iyer et al. |
| 2005/0243626 A1 | 11/2005 | Ronen |
| 2006/0004952 A1 | 1/2006 | Lasser |
| 2006/0028875 A1 | 2/2006 | Avraham et al. |
| 2006/0028877 A1 | 2/2006 | Meir |
| 2006/0101193 A1 | 5/2006 | Murin |
| 2006/0106972 A1 | 5/2006 | Gorobets et al. |
| 2006/0107136 A1 | 5/2006 | Gongwer et al. |
| 2006/0129750 A1 | 6/2006 | Lee et al. |
| 2006/0133141 A1 | 6/2006 | Gorobets |
| 2006/0156189 A1 | 7/2006 | Tomlin |
| 2006/0179334 A1 | 8/2006 | Brittain et al. |
| 2006/0190699 A1 | 8/2006 | Lee |
| 2006/0203546 A1 | 9/2006 | Lasser |
| 2006/0218359 A1 | 9/2006 | Sanders et al. |
| 2006/0221692 A1 | 10/2006 | Chen |
| 2006/0221705 A1 | 10/2006 | Hemink et al. |
| 2006/0221714 A1 | 10/2006 | Li et al. |
| 2006/0239077 A1 | 10/2006 | Park et al. |
| 2006/0239081 A1 | 10/2006 | Roohparvar |
| 2006/0256620 A1 | 11/2006 | Nguyen et al. |
| 2006/0256626 A1 | 11/2006 | Werner et al. |
| 2006/0256891 A1 | 11/2006 | Yuan et al. |
| 2006/0268609 A1 * | 11/2006 | Kim et al. ............... 365/185.11 |
| 2006/0271748 A1 | 11/2006 | Jain et al. |
| 2006/0285392 A1 | 12/2006 | Incarnati et al. |
| 2006/0285396 A1 | 12/2006 | Ha |
| 2007/0006013 A1 | 1/2007 | Moshayedi et al. |
| 2007/0019481 A1 | 1/2007 | Park |
| 2007/0033581 A1 | 2/2007 | Tomlin et al. |
| 2007/0047314 A1 | 3/2007 | Goda et al. |
| 2007/0047326 A1 | 3/2007 | Nguyen et al. |
| 2007/0050536 A1 | 3/2007 | Kolokowsky |
| 2007/0058446 A1 | 3/2007 | Hwang et al. |
| 2007/0061502 A1 | 3/2007 | Lasser et al. |
| 2007/0067667 A1 | 3/2007 | Ikeuchi et al. |
| 2007/0074093 A1 * | 3/2007 | Lasser ............................ 714/763 |
| 2007/0076502 A1 * | 4/2007 | Pyeon et al. ................. 365/221 |
| 2007/0086239 A1 | 4/2007 | Litsyn et al. |
| 2007/0086260 A1 | 4/2007 | Sinclair |
| 2007/0089034 A1 | 4/2007 | Litsyn et al. |
| 2007/0091677 A1 | 4/2007 | Lasser et al. |
| 2007/0091694 A1 | 4/2007 | Lee et al. |
| 2007/0103978 A1 | 5/2007 | Conley et al. |
| 2007/0103986 A1 | 5/2007 | Chen |
| 2007/0104211 A1 | 5/2007 | Opsasnick |
| 2007/0109845 A1 | 5/2007 | Chen |
| 2007/0109849 A1 | 5/2007 | Chen |
| 2007/0115726 A1 | 5/2007 | Cohen et al. |
| 2007/0118713 A1 | 5/2007 | Guterman et al. |
| 2007/0143378 A1 | 6/2007 | Gorobetz |
| 2007/0143531 A1 | 6/2007 | Atri |
| 2007/0159889 A1 | 7/2007 | Kang et al. |
| 2007/0159892 A1 | 7/2007 | Kang et al. |
| 2007/0159907 A1 | 7/2007 | Kwak |
| 2007/0168837 A1 | 7/2007 | Murin |
| 2007/0171714 A1 | 7/2007 | Wu et al. |
| 2007/0183210 A1 | 8/2007 | Choi et al. |
| 2007/0189073 A1 | 8/2007 | Aritome |
| 2007/0195602 A1 | 8/2007 | Fong et al. |
| 2007/0206426 A1 | 9/2007 | Mokhlesi |
| 2007/0208904 A1 | 9/2007 | Hsieh et al. |
| 2007/0226599 A1 | 9/2007 | Motwani |

(56) References Cited

U.S. PATENT DOCUMENTS

| | | |
|---|---|---|
| 2007/0233939 A1* | 10/2007 | Kim .................. 711/103 |
| 2007/0236990 A1 | 10/2007 | Aritome |
| 2007/0253249 A1 | 11/2007 | Kang et al. |
| 2007/0256620 A1 | 11/2007 | Viggiano et al. |
| 2007/0263455 A1 | 11/2007 | Cornwell et al. |
| 2007/0266232 A1 | 11/2007 | Rodgers et al. |
| 2007/0271424 A1 | 11/2007 | Lee et al. |
| 2007/0280000 A1 | 12/2007 | Fujiu et al. |
| 2007/0291571 A1 | 12/2007 | Balasundaram |
| 2007/0297234 A1 | 12/2007 | Cernea et al. |
| 2008/0010395 A1 | 1/2008 | Mylly et al. |
| 2008/0025121 A1 | 1/2008 | Tanzawa |
| 2008/0043535 A1 | 2/2008 | Roohparvar |
| 2008/0049504 A1 | 2/2008 | Kasahara et al. |
| 2008/0049506 A1 | 2/2008 | Guterman |
| 2008/0052446 A1 | 2/2008 | Lasser et al. |
| 2008/0055993 A1 | 3/2008 | Lee |
| 2008/0080243 A1 | 4/2008 | Edahiro et al. |
| 2008/0082730 A1 | 4/2008 | Kim et al. |
| 2008/0089123 A1 | 4/2008 | Chae et al. |
| 2008/0104309 A1 | 5/2008 | Cheon et al. |
| 2008/0104312 A1 | 5/2008 | Lasser |
| 2008/0109590 A1 | 5/2008 | Jung et al. |
| 2008/0115017 A1 | 5/2008 | Jacobson |
| 2008/0123420 A1 | 5/2008 | Brandman et al. |
| 2008/0123426 A1 | 5/2008 | Lutze et al. |
| 2008/0126686 A1 | 5/2008 | Sokolov et al. |
| 2008/0130341 A1 | 6/2008 | Shalvi et al. |
| 2008/0148115 A1 | 6/2008 | Sokolov et al. |
| 2008/0151618 A1 | 6/2008 | Sharon et al. |
| 2008/0151667 A1 | 6/2008 | Miu et al. |
| 2008/0158958 A1 | 7/2008 | Sokolov et al. |
| 2008/0181001 A1 | 7/2008 | Shalvi |
| 2008/0198650 A1 | 8/2008 | Shalvi et al. |
| 2008/0198654 A1 | 8/2008 | Toda |
| 2008/0209116 A1 | 8/2008 | Caulkins |
| 2008/0209304 A1 | 8/2008 | Winarski et al. |
| 2008/0215798 A1 | 9/2008 | Sharon et al. |
| 2008/0219050 A1* | 9/2008 | Shalvi et al. .......... 365/185.03 |
| 2008/0239093 A1 | 10/2008 | Easwar et al. |
| 2008/0239812 A1 | 10/2008 | Abiko et al. |
| 2008/0253188 A1 | 10/2008 | Aritome |
| 2008/0263262 A1 | 10/2008 | Sokolov et al. |
| 2008/0263676 A1 | 10/2008 | Mo et al. |
| 2008/0270730 A1 | 10/2008 | Lasser et al. |
| 2008/0282106 A1 | 11/2008 | Shalvi et al. |
| 2008/0288714 A1 | 11/2008 | Salomon et al. |
| 2009/0013233 A1 | 1/2009 | Radke |
| 2009/0024905 A1 | 1/2009 | Shalvi et al. |
| 2009/0034337 A1 | 2/2009 | Aritome |
| 2009/0043831 A1 | 2/2009 | Antonopoulos et al. |
| 2009/0043951 A1 | 2/2009 | Shalvi et al. |
| 2009/0049234 A1 | 2/2009 | Oh et al. |
| 2009/0073762 A1 | 3/2009 | Lee et al. |
| 2009/0086542 A1 | 4/2009 | Lee et al. |
| 2009/0089484 A1 | 4/2009 | Chu |
| 2009/0091979 A1 | 4/2009 | Shalvi |
| 2009/0094930 A1 | 4/2009 | Schwoerer |
| 2009/0106485 A1 | 4/2009 | Anholt |
| 2009/0112949 A1 | 4/2009 | Ergan et al. |
| 2009/0132755 A1 | 5/2009 | Radke |
| 2009/0144600 A1 | 6/2009 | Perlmutter et al. |
| 2009/0150894 A1 | 6/2009 | Huang et al. |
| 2009/0157950 A1 | 6/2009 | Selinger |
| 2009/0157964 A1 | 6/2009 | Kasorla et al. |
| 2009/0158126 A1 | 6/2009 | Perlmutter et al. |
| 2009/0168524 A1 | 7/2009 | Golov et al. |
| 2009/0172257 A1 | 7/2009 | Prins et al. |
| 2009/0172261 A1 | 7/2009 | Prins et al. |
| 2009/0193184 A1 | 7/2009 | Yu et al. |
| 2009/0199074 A1 | 8/2009 | Sommer et al. |
| 2009/0204824 A1 | 8/2009 | Lin et al. |
| 2009/0204872 A1 | 8/2009 | Yu et al. |
| 2009/0213653 A1 | 8/2009 | Perlmutter et al. |
| 2009/0213654 A1 | 8/2009 | Perlmutter et al. |
| 2009/0225595 A1 | 9/2009 | Kim |
| 2009/0228761 A1 | 9/2009 | Perlmutter et al. |
| 2009/0240872 A1 | 9/2009 | Perlmutter et al. |
| 2009/0248964 A1* | 10/2009 | Yano et al. .................. 711/103 |
| 2009/0265509 A1 | 10/2009 | Klein |
| 2009/0300227 A1 | 12/2009 | Nochimowski et al. |
| 2009/0323412 A1 | 12/2009 | Mokhlesi et al. |
| 2009/0327608 A1 | 12/2009 | Eschmann |
| 2010/0017650 A1 | 1/2010 | Chin et al. |
| 2010/0034022 A1 | 2/2010 | Dutta et al. |
| 2010/0057976 A1 | 3/2010 | Lasser |
| 2010/0061151 A1 | 3/2010 | Miwa et al. |
| 2010/0082883 A1 | 4/2010 | Chen et al. |
| 2010/0083247 A1 | 4/2010 | Kanevsky et al. |
| 2010/0110580 A1 | 5/2010 | Takashima |
| 2010/0131697 A1 | 5/2010 | Alrod et al. |
| 2010/0142268 A1 | 6/2010 | Aritome |
| 2010/0142277 A1 | 6/2010 | Yang et al. |
| 2010/0169547 A1 | 7/2010 | Ou |
| 2010/0169743 A1 | 7/2010 | Vogan et al. |
| 2010/0174847 A1 | 7/2010 | Paley et al. |
| 2010/0174851 A1* | 7/2010 | Leibowitz et al. ............ 711/103 |
| 2010/0211803 A1 | 8/2010 | Lablans |
| 2010/0287217 A1 | 11/2010 | Borchers et al. |
| 2011/0010489 A1 | 1/2011 | Yeh |
| 2011/0060969 A1 | 3/2011 | Ramamoorthy et al. |
| 2011/0066793 A1 | 3/2011 | Burd |
| 2011/0075482 A1 | 3/2011 | Shepard et al. |
| 2011/0107049 A1 | 5/2011 | Kwon et al. |
| 2011/0149657 A1 | 6/2011 | Haratsch et al. |
| 2011/0199823 A1 | 8/2011 | Bar-Or et al. |
| 2011/0302354 A1 | 12/2011 | Miller |

FOREIGN PATENT DOCUMENTS

| | | |
|---|---|---|
| EP | 1605509 A1 | 12/2005 |
| WO | 9610256 A1 | 4/1996 |
| WO | 9828745 A1 | 7/1998 |
| WO | 02100112 A1 | 12/2002 |
| WO | 03100791 A1 | 12/2003 |
| WO | 2007046084 A2 | 4/2007 |
| WO | 2007132452 A2 | 11/2007 |
| WO | 2007132453 A2 | 11/2007 |
| WO | 2007132456 A2 | 11/2007 |
| WO | 2007132457 A2 | 11/2007 |
| WO | 2007132458 A2 | 11/2007 |
| WO | 2007146010 A2 | 12/2007 |
| WO | 2008026203 A2 | 3/2008 |
| WO | 2008053472 A2 | 5/2008 |
| WO | 2008053473 A2 | 5/2008 |
| WO | 2008068747 A2 | 6/2008 |
| WO | 2008077284 A1 | 7/2008 |
| WO | 2008083131 A2 | 7/2008 |
| WO | 2008099958 A1 | 8/2008 |
| WO | 2008111058 A2 | 9/2008 |
| WO | 2008124760 A2 | 10/2008 |
| WO | 2008139441 A2 | 11/2008 |
| WO | 2009037691 A2 | 3/2009 |
| WO | 2009037697 A2 | 3/2009 |
| WO | 2009038961 A2 | 3/2009 |
| WO | 2009050703 A2 | 4/2009 |
| WO | 2009053961 A2 | 4/2009 |
| WO | 2009053962 A2 | 4/2009 |
| WO | 2009053963 A2 | 4/2009 |
| WO | 2009063450 A2 | 5/2009 |
| WO | 2009072100 A2 | 6/2009 |
| WO | 2009072101 A2 | 6/2009 |
| WO | 2009072102 A2 | 6/2009 |
| WO | 2009072103 A2 | 6/2009 |
| WO | 2009072104 A2 | 6/2009 |
| WO | 2009072105 A2 | 6/2009 |
| WO | 2009074978 A2 | 6/2009 |
| WO | 2009074979 A2 | 6/2009 |
| WO | 2009078006 A2 | 6/2009 |

(56) References Cited

FOREIGN PATENT DOCUMENTS

WO  2009095902 A2  8/2009
WO  2011024015 A1  3/2011

OTHER PUBLICATIONS

Jedec, "UFS Specification", version 0.1, Nov. 11, 2009.
SD Group and SD Card Association, "SD Specifications Part 1 Physical Layer Specification", version 3.01, draft 1.00, Nov. 9, 2009.
Compaq et al., "Universal Serial Bus Specification", revision 2.0, Apr. 27, 2000.
Serial ATA International Organization, "Serial ATA Revision 3.0 Specification", Jun. 2, 2009.
Gotou, H., "An Experimental Confirmation of Automatic Threshold Voltage Convergence in a Flash Memory Using Alternating Word-Line Voltage Pulses", IEEE Electron Device Letters, vol. 18, No. 10, pp. 503-505, Oct. 1997.
Numonyx, "M25PE16: 16-Mbit, page-erasable serial flash memory with byte-alterability, 75 MHz SPI bus, standard pinout", Apr. 2008.
Hong et al., "NAND Flash-based Disk Cache Using SLC/MLC Combined Flash Memory", 2010 International Workshop on Storage Network Architecture and Parallel I/Os, pp. 21-30, USA, May 3, 2010.
Kim et al., "Multi-bit Error Tolerant Caches Using Two-Dimensional Error Coding", Proceedings of the 40th Annual ACM/IEEE International Symposium on Microarchitecture (MICRO-40), Chicago, USA, Dec. 1-5, 2007.
Engineering Windows 7, "Support and Q&A for Solid-State Drives", e7blog, May 5, 2009.
Micron Technology Inc., "Memory Management in NAND Flash Arrays", Technical Note, year 2005.
Kang et al., "A Superblock-based Flash Translation Layer for NAND Flash Memory", Proceedings of the 6th ACM & IEEE International Conference on Embedded Software, pp. 161-170, Seoul, Korea, Oct. 22-26, 2006.
Park et al., "Sub-Grouped Superblock Management for High-Performance Flash Storages", IEICE Electronics Express, vol. 6, No. 6, pp. 297-303, Mar. 25, 2009.
"How to Resolve "Bad Super Block: Magic Number Wrong" in BSD", Free Online Articles Director Article Base, posted Sep. 5, 2009.
UBUNTU Forums, "Memory Stick Failed IO Superblock", posted Nov. 11, 2009.
Super User Forums, "SD Card Failure, can't read superblock", posted Aug. 8, 2010.
Agrell et al., "Closest Point Search in Lattices", IEEE Transactions on Information Theory, vol. 48, No. 8, pp. 2201-2214, Aug. 2002.
Bez et al., "Introduction to Flash memory", Proceedings of the IEEE, vol. 91, No. 4, pp. 489-502, Apr. 2003.
Blahut, R.E., "Theory and Practice of Error Control Codes," Addison-Wesley, May 1984, section 3.2, pp. 47-48.
Chang, L., "Hybrid Solid State Disks: Combining Heterogeneous NAND Flash in Large SSDs", ASPDAC, Jan. 2008.
Cho et al., "Multi-Level NAND Flash Memory with Non-Uniform Threshold Voltage Distribution," IEEE International Solid-State Circuits Conference (ISSCC), San Francisco, CA, Feb. 5-7, 2001, pp. 28-29 and 424.
Databahn™, "Flash memory controller IP", Denali Software, Inc., 1994 https://www.denali.com/en/products/databahn_flash.jsp.
Datalight, Inc., "FlashFX Pro 3.1 High Performance Flash Manager for Rapid Development of Reliable Products", Nov. 16, 2006.
Duann, N., Silicon Motion Presentation "SLC & MLC Hybrid", Flash Memory Summit, Santa Clara, USA, Aug. 2008.
Eitan et al., "Can NROM, a 2-bit, Trapping Storage NVM Cell, Give a Real Challenge to Floating Gate Cells?", Proceedings of the 1999 International Conference on Solid State Devices and Materials (SSDM), pp. 522-524, Tokyo, Japan 1999.
Eitan et al., "Multilevel Flash Cells and their Trade-Offs", Proceedings of the 1996 IEEE International Electron Devices Meeting (IEDM), pp. 169-172, New York, USA 1996.

Engh et al., "A self adaptive programming method with 5 mV accuracy for multi-level storage in FLASH", pp. 115-118, Proceedings of the IEEE 2002 Custom Integrated Circuits Conference, May 12-15, 2002.
Goodman et al., "On-Chip ECC for Multi-Level Random Access Memories," Proceedings of the IEEE/CAM Information Theory Workshop, Ithaca, USA, Jun. 25-29, 1989.
Han et al., "An Intelligent Garbage Collection Algorithm for Flash Memory Storages", Computational Science and Its Applications—ICCSA 2006, vol. 3980/2006, pp. 1019-1027, Springer Berlin / Heidelberg, Germany, May 11, 2006.
Han et al., "CATA: A Garbage Collection Scheme for Flash Memory File Systems", Ubiquitous Intelligence and Computing, vol. 4159/2006, pp. 103-112, Springer Berlin / Heidelberg, Aug. 25, 2006.
Horstein, "On the Design of Signals for Sequential and Nonsequential Detection Systems with Feedback," IEEE Transactions on Information Theory IT-12:4 (Oct. 1966), pp. 448-455.
Jung et al., In "A 117 mm.sup.2 3.3V Only 128 Mb Multilevel NAND Flash Memory for Mass Storage Applications," IEEE Journal of Solid State Circuits, (11:31), Nov. 1996, pp. 1575-1583.
Kawaguchi et al. 1995. A flash-memory based file system. In Proceedings of the USENIX 1995 Technical Conference, New Orleans, Louisiana. 155-164.
Kim et al., "Future Memory Technology including Emerging New Memories", Proceedings of the 24th International Conference on Microelectronics (MIEL), vol. 1, pp. 377-384, Nis, Serbia and Montenegro, May 16-19, 2004.
Lee et al., "Effects of Floating Gate Interference on NAND Flash Memory Cell Operation", IEEE Electron Device Letters, vol. 23, No. 5, pp. 264-266, May 2002.
Maayan et al., "A 512 Mb NROM Flash Data Storage Memory with 8 MB/s Data Rate", Proceedings of the 2002 IEEE International Solid-State circuits Conference (ISSCC 2002), pp. 100-101, San Francisco, USA, Feb. 3-7, 2002.
Mielke et al., "Recovery Effects in the Distributed Cycling of Flash Memories", IEEE 44th Annual International Reliability Physics Symposium, pp. 29-35, San Jose, USA, Mar. 2006.
Onfi, "Open NAND Flash Interface Specification," revision 1.0, Dec. 28, 2006.
Phison Electronics Corporation, "PS8000 Controller Specification (for SD Card)", revision 1.2, Document No. S-07018, Mar. 28, 2007.
Shalvi, et al., "Signal Codes," Proceedings of the 2003 IEEE Information Theory Workshop (ITW' 2003), Paris, France, Mar. 31-Apr. 4, 2003.
Shiozaki, A., "Adaptive Type-II Hybrid Broadcast ARQ System", IEEE Transactions on Communications, vol. 44, Issue 4, pp. 420-422, Apr. 1996.
Suh et al., "A 3.3V 32Mb NAND Flash Memory with Incremental Step Pulse Programming Scheme", IEEE Journal of Solid-State Circuits, vol. 30, No. 11, pp. 1149-1156, Nov. 1995.
ST Microelectronics, "Bad Block Management in NAND Flash Memories", Application note AN-1819, Geneva, Switzerland, May 2004.
ST Microelectronics, "Wear Leveling in Single Level Cell NAND Flash Memories," Application note AN-1822 Geneva, Switzerland, Feb. 2007.
Takeuchi et al., "A Double Level $V_{TH}$ Select Gate Array Architecture for Multi-Level NAND Flash Memories", Digest of Technical Papers, 1995 Symposium on VLSI Circuits, pp. 69-70, Jun. 8-10, 1995.
Takeuchi et al., "A Multipage Cell Architecture for High-Speed Programming Multilevel NAND Flash Memories", IEEE Journal of Solid State Circuits, vol. 33, No. 8, Aug. 1998.
Wu et al., "eNVy: A non-Volatile, Main Memory Storage System", Proceedings of the 6th International Conference on Architectural support for programming languages and operating systems, pp. 86-87, San Jose, USA, 1994.
International Application PCT/IL2007/000575 Patentability report dated Mar. 26, 2009.
International Application PCT/IL2007/000575 Search Report dated May 30, 2008.
International Application PCT/IL2007/000576 Patentability Report dated Mar. 19, 2009.

(56) References Cited

OTHER PUBLICATIONS

International Application PCT/IL2007/000576 Search Report dated Jul. 7, 2008.
International Application PCT/IL2007/000579 Patentability report dated Mar. 10, 2009.
International Application PCT/IL2007/000579 Search report dated Jul. 3, 2008.
International Application PCT/IL2007/000580 Patentability Report dated Mar. 10, 2009.
International Application PCT/IL2007/000580 Search Report dated Sep. 11, 2008.
International Application PCT/IL2007/000581 Patentability Report dated Mar. 26, 2009.
International Application PCT/IL2007/000581 Search Report dated Aug. 25, 2008.
International Application PCT/IL2007/001059 Patentability report dated Apr. 19, 2009.
International Application PCT/IL2007/001059 Search report dated Aug. 7, 2008.
International Application PCT/IL2007/001315 search report dated Aug. 7, 2008.
International Application PCT/IL2007/001315 Patentability Report dated May 5, 2009.
International Application PCT/IL2007/001316 Search report dated Jul. 22, 2008.
International Application PCT/IL2007/001316 Patentability Report dated May 5, 2009.
International Application PCT/IL2007/001488 Search report dated Jun. 20, 2008.
International Application PCT/IL2008/000329 Search report dated Nov. 25, 2008.
International Application PCT/IL2008/000519 Search report dated Nov. 20, 2008.
International Application PCT/IL2008/001188 Search Report dated Jan. 28, 2009.
International Application PCT/IL2008/001356 Search Report dated Feb. 3, 2009.
International Application PCT/IL2008/001446 Search report dated Feb. 20, 2009.
U.S. Appl. No. 11/949,135 Official Action dated Oct. 2, 2009.
U.S. Appl. No. 12/019,011 Official Action dated Nov. 20, 2009.
Sommer, N., U.S. Appl. No. 12/171,797 "Memory Device with Non-Uniform Programming Levels" filed Jul. 11, 2008.
Shalvi et al., U.S. Appl. No. 12/251,471 "Compensation for Voltage Drifts in Analog Memory Cells" filed Oct. 15, 2008.
Sommer et al., U.S. Appl. No. 12/497,707 "Data Storage in Analog Memory Cells with Protection Against Programming Interruption" filed Jul. 6, 2009.
Winter et al., U.S. Appl. No. 12/534,893 "Improved Data Storage in Analog Memory Cells Using Modified Pass Voltages" filed Aug. 4, 2009.
Winter et al. U.S. Appl. No. 12/534,898 "Data Storage Using Modified Voltages" filed Aug. 4, 2009.
Shalvi et al., U.S. Appl. No. 12/551,583 "Segmented Data Storage" filed Sep. 1, 2009.
Shalvi et al., U.S. Appl. No. 12/551,567 "Reliable Data Storage in Analog Memory Cells Subjected to Long Retention Periods" filed Sep. 1, 2009.
Perlmutter et al., U.S. Appl. No. 12/558,528 "Estimation of Memory Cell Read Thresholds by Sampling Inside Programming Level Distribution Intervals" filed Sep. 13, 2009.
Sokolov, D., U.S. Appl. No. 12/579,430 "Efficient Programming of Analog Memory Cell Devices" filed Oct. 15, 2009.
Shalvi, O., U.S. Appl. No. 12/579,432 "Efficient Data Storage in Storage Device Arrays" filed Oct. 15, 2009.
Sommer et al., U.S. Appl. No. 12/607,078 "Data Scrambling in Memory Devices" filed Oct. 28, 2009.
Sommer et al., U.S. Appl. No. 12/607,085 "Data Scrambling Schemes for Memory Devices" filed Oct. 28, 2009.
Shalvi et al., U.S. Appl. No. 12/618,732 "Storage at M Bits/Cell Density in N Bits/Cell Analog Memory Cell Devices, M>N" filed Nov. 15, 2009.
Sommer et al., U.S. Appl. No. 12/649,358 "Efficient Readout Schemes for Analog Memory Cell Devices" filed Dec. 30, 2009.
Sommer et al., U.S. Appl. No. 12/649,360 "Efficient Readout Schemes for Analog Memory Cell Devices Using Multiple Read Threshold Sets" filed Dec. 30, 2009.
Rotbard et al., U.S. Appl. No. 12/649,382 "Rejuvenation of Analog Memory Cells" filed Dec. 30, 2009.
Shachar et al., U.S. Appl. No. 12/688,883 "Hierarchical data storage system" filed Jan. 17, 2010.
Ankolekar et al., "Multibit Error-Correction Methods for Latency-Constrained Flash Memory Systems", IEEE Transactions on Device and Materials Reliability, vol. 10, No. 1, pp. 33-39, Mar. 2010.
Berman et al., "Mitigating Inter-Cell Coupling Effects in MLC NAND Flash via Constrained Coding", Flash Memory Summit, Santa Clara, USA, Aug. 19, 2010.
CN Patent Application # 200780026181.3 Official Action dated Apr. 8, 2011.
Chinese Patent Application # 200780026181.3 Official Action dated Mar. 7, 2012.
Chinese Patent Application # 200780026094.8 Official Action dated Feb. 2, 2012.
Budilovsky et al., "Prototyping a High-Performance Low-Cost Solid-State Disk", SYSTOR—The 4th Annual International Systems and Storage Conference, Haifa, Israel, May 30-Jun. 1, 2011.
NVM Express Protocol, "NVM Express", Revision 1.0b, Jul. 12, 2011.
SCSI Protocol, "Information Technology—SCSI Architecture Model-5 (SAM-5)", INCITS document T10/2104-D, revision 01, Jan. 28, 2009.
SAS Protocol, "Information Technology—Serial Attached SCSI-2 (SAS-2)", INCITS document T10/1760-D, revision 15a, Feb. 22, 2009.
Wei, L., "Trellis-Coded Modulation With Multidimensional Constellations", IEEE Transactions on Information Theory, vol. IT-33, No. 4, pp. 483-501, Jul. 1987.
Conway et al., "Sphere Packings, Lattices and Groups", 3rd edition, chapter 4, pp. 94-135, Springer, New York, USA 1998.
Chinese Patent Application # 200780040493.X Official Action dated Jun. 15, 2011.
Huffman, A., "Non-Volatile Memory Host Controller Interface (NVMHCI)", Specification 1.0, Apr. 14, 2008.
Panchbhai et al., "Improving Reliability of NAND Based Flash Memory Using Hybrid SLC/MLC Device", Project Proposal for CSci 8980—Advanced Storage Systems, University of Minnesota, USA, Spring 2009.
Shalvi et al., U.S. Appl. No. 12/822,207 "Adaptive Over-Provisioning in Memory Systems" filed Jun. 24, 2010.
International Search Report and Written Opinion from PCT/2013/056069, mailed Nov. 29, 2013, Apple Inc., pp. 1-9.

* cited by examiner

MEMORY SYSTEM INCLUDING A CONTROLLER AND PROCESSORS ASSOCIATED WITH MEMORY DEVICES

CROSS-REFERENCE TO RELATED APPLICATIONS

This application claims the benefit of U.S. Provisional Patent Application 61/145,562, filed Jan. 18, 2009, U.S. Provisional Patent Application 61/163,133, filed Mar. 25, 2009, U.S. Provisional Patent Application 61/163,138, filed Mar. 25, 2009, and U.S. Provisional Patent Application 61/294,498, filed Jan. 13, 2010, whose disclosures are incorporated herein by reference.

FIELD OF THE INVENTION

The present invention relates generally to data storage, and particularly to distributed data storage in multiple memory devices.

BACKGROUND OF THE INVENTION

Several types of memory devices, such as Flash memories, use arrays of analog memory cells for storing data. Each analog memory cell stores a quantity of an analog value, also referred to as a storage value, such as an electrical charge or voltage. This analog value represents the information stored in the cell. In Flash memories, for example, each analog memory cell holds a certain amount of electrical charge. The range of possible analog values is typically divided into intervals, each interval corresponding to one or more data bit values. Data is written to an analog memory cell by writing a nominal analog value that corresponds to the desired bit or bits.

Some memory devices, commonly referred to as Single-Level Cell (SLC) devices, store a single bit of information in each memory cell, i.e., each memory cell can be programmed to assume two possible programming levels. Higher-density devices, often referred to as Multi-Level Cell (MLC) devices, store two or more bits per memory cell, i.e., can be programmed to assume more than two possible programming levels.

Flash memory devices are described, for example, by Bez et al., in "Introduction to Flash Memory," Proceedings of the IEEE, volume 91, number 4, April, 2003, pages 489-502, which is incorporated herein by reference. Multi-level Flash cells and devices are described, for example, by Eitan et al., in "Multilevel Flash Cells and their Trade-Offs," Proceedings of the 1996 IEEE International Electron Devices Meeting (IEDM), New York, N.Y., pages 169-172, which is incorporated herein by reference. The paper compares several kinds of multilevel Flash cells, such as common ground, DINOR, AND, NOR and NAND cells.

Eitan et al., describe another type of analog memory cell called Nitride Read Only Memory (NROM) in "Can NROM, a 2-bit, Trapping Storage NVM Cell, Give a Real Challenge to Floating Gate Cells?" Proceedings of the 1999 International Conference on Solid State Devices and Materials (SSDM), Tokyo, Japan, Sep. 21-24, 1999, pages 522-524, which is incorporated herein by reference. NROM cells are also described by Maayan et al., in "A 512 Mb NROM Flash Data Storage Memory with 8 MB/s Data Rate", Proceedings of the 2002 IEEE International Solid-State Circuits Conference (ISSCC 2002), San Francisco, Calif., Feb. 3-7, 2002, pages 100-101, which is incorporated herein by reference. Other exemplary types of analog memory cells are Floating Gate (FG) cells, Ferroelectric RAM (FRAM) cells, magnetic RAM (MRAM) cells, Charge Trap Flash (CTF) and phase change RAM (PRAM, also referred to as Phase Change Memory—PCM) cells. FRAM, MRAM and PRAM cells are described, for example, by Kim and Koh in "Future Memory Technology including Emerging New Memories," Proceedings of the 24th International Conference on Microelectronics (MIEL), Nis, Serbia and Montenegro, May 16-19, 2004, volume 1, pages 377-384, which is incorporated herein by reference.

Some memory systems store data in a plurality of memory devices using multiple processors or controllers. For example, U.S. Patent Application Publication 2009/0172257, whose disclosure is incorporated herein by reference, describes a mass storage system and method for breaking a host command into a hierarchy of data structures. Different types of data structures are designed to handle different phases of tasks required by the host command, and multiple data structures are sometimes used to handle portions of the host command in parallel. Disclosed embodiments include a Flash memory controller designed to allow a high degree of pipelining and parallelism.

U.S. Patent Application Publication 2009/0172261, whose disclosure is incorporated herein by reference, describes a storage controller containing multiple processors. The processors are divided into groups, each of which handles a different stage of a pipelined process of performing host reads and writes. In one embodiment, the storage controller operates with a Flash memory module, and includes multiple parallel pipelines that allow plural host commands to be handled simultaneously.

SUMMARY OF THE INVENTION

An embodiment of the present invention provides a data storage system, including:

a plurality of non-volatile memory devices arranged in one or more sets;

a main controller, which is configured to accept commands from a host, and to convert the commands into recipes, each recipe including a list of multiple memory operations to be performed sequentially in the non-volatile memory devices belonging to one of the sets; and one or more processors, each of which processors is associated with a respective set of the non-volatile memory devices and is configured to receive one or more of the recipes from the main controller and to execute the memory operations specified in the received recipes in the non-volatile memory devices belonging to the respective set.

In some embodiments, the memory operations in each recipe access multiple memory pages in the non-volatile memory devices. In an embodiment, the main controller is configured to generate a recipe that instructs a given processor to perform at least one action selected from a group of actions consisting of reading multiple pages from the non-volatile memory devices, writing multiple pages in the non-volatile memory devices, and erasing one or more memory areas in the non-volatile memory devices. In another embodiment, the main controller is configured to generate a recipe that instructs a given processor to copy multiple pages from one or more first locations in the non-volatile memory devices to a second location in the non-volatile memory devices. The recipe may instruct the given processor to modify at least one of the pages read from the first locations and to write the modified pages to the second location.

In a disclosed embodiment, the main controller is configured to generate a recipe that instructs a given processor to read first data from a first location in the non-volatile memory devices, to use the first data as an address pointing to a second location in the non-volatile memory devices, and to read second data from the second location using the address. In an embodiment, the system includes a volatile memory coupled to the main controller, and a given processor is configured to store in the volatile memory data that is used in executing the received recipes. In another embodiment, a volatile memory is coupled to the main controller, and the main controller is configured to generate a recipe that instructs a given processor to read first data from the volatile memory, to read second data from the non-volatile memory devices, to merge the first and second data, and to write the merged first and second data into the non-volatile memory devices. In yet another embodiment, each processor is configured to send to the main controller a request for exchanging data between the processor and the main controller, and the main controller is configured to exchange the data with the processor responsively to the request.

In some embodiments, the commands accepted from the host specify logical addresses, and the main controller is configured to translate the logical addresses into respective physical storage locations in the non-volatile memory devices, and to specify the memory operations in the recipes using the physical storage locations. In an embodiment, each processor is configured to store in the non-volatile memory devices given data and a logical address corresponding to the given data, to receive a recipe, which instructs the processor to retrieve the given data from the non-volatile memory devices and indicates the logical address, to read the given data and the logical address from the non-volatile memory devices, and to report an error responsively to detecting a mismatch between the logical address indicated in the recipe and the logical address read from the non-volatile memory devices. In another embodiment, each processor is configured to store in the non-volatile memory devices given data and a logical address corresponding to the given data, and, when copying the given data to an alternative physical storage location in the non-volatile memory devices, to read the logical address of the given data from the non-volatile memory devices and to indicate to the main controller that the read logical address in associated with the alternative physical storage location.

In a disclosed embodiment, the main controller is configured to assign respective priorities to the recipes, and each processor is configured to execute the recipes in accordance with the priorities. Additionally or alternatively, each processor is configured to receive two or more of the recipes in a first order, and to execute the recipes in a second order, different from the first order. In another embodiment, each processor is configured to identify that a first recipe includes a first write operation addressed to a given location in the non-volatile memory devices, and that a second recipe includes a second write operation, which is addressed to the given location and is subsequent to the first write operation, and to inhibit execution of the first write operation.

In still another embodiment, each processor is configured to identify that a first recipe includes a first read operation addressed to a given location in the non-volatile memory devices, and that a second recipe includes a second read operation, which is addressed to the given location and is subsequent to the first read operation, and to inhibit execution of the second read operation. In an embodiment, each processor is configured to identify that a first recipe includes a write operation that writes a value to a given location in the non-volatile memory devices, and that a second recipe includes a read operation that is addressed to the given location and is subsequent to the first write operation, and to serve the read operation from an internally-buffered version of the value obtained from the write operation, without applying the read operation to the non-volatile memory devices.

In some embodiments, the non-volatile memory devices include multiple analog memory cells arranged in groups, the system includes a volatile memory coupled to the main controller, and the main controller is configured to store in the volatile memory respective values of at least one property of the memory cells for at least some of the groups, and, when producing a recipe that addresses a given group, to indicate in the recipe a value of the property for the given group. In an embodiment, each processor is configured to extract the value of the property from the received recipe, and to execute the memory operations specified in the recipe responsively to the extracted value. In a disclosed embodiment, the at least one property includes Programming and Verification (PV) levels used in programming the memory cells, read thresholds used in reading the memory cells, endurance measures of the memory cells, elapsed times since latest programming of the memory cells, estimates of read disturb in the memory cells, and/or time-temperature integral values computed over the memory cells. In an embodiment, the main controller is configured to store in the volatile memory one or more read threshold values applicable to each of at least some of the groups, and to update the read threshold values during operation of the system.

In another embodiment, the main controller is configured to convert a given host command to a set of one or more recipes, and to send a command completion indication to the host after sending the set of the recipes to the processors, irrespective of execution of the recipes in the set. In yet another embodiment, a volatile memory is coupled to the main controller, and the main controller is configured to store in the volatile memory a linked list of data items representing data, each data item including a portion of the data and a pointer to a next data item on the list, and to generate a recipe that instructs a given processor to store the data in the non-volatile memory devices and points to a first data item on the list. In an embodiment, the given processor is configured to store the data by reading each data item from the volatile memory, storing the respective portion of the data in the non-volatile memory devices, extracting the pointer to the next data item from the read data item, and reading the next data item from the volatile memory responsively to the pointer.

There is additionally provided, in accordance with an embodiment of the present invention, a method for data storage, including:

accepting commands from a host for data storage in a plurality of non-volatile memory devices arranged in one or more sets;

converting the commands into recipes, each recipe including a list of multiple memory operations to be performed sequentially in the non-volatile memory devices belonging to one of the sets; and executing the recipes using one or more processors, each of which processors is associated with a respective set of the non-volatile memory devices, receives one or more of the recipes, and executes the memory operations specified in the received recipes in the non-volatile memory devices belonging to the respective set.

The present invention will be more fully understood from the following detailed description of the embodiments thereof, taken together with the drawings in which:

DETAILED DESCRIPTION OF EMBODIMENTS

Overview

Figure 1:
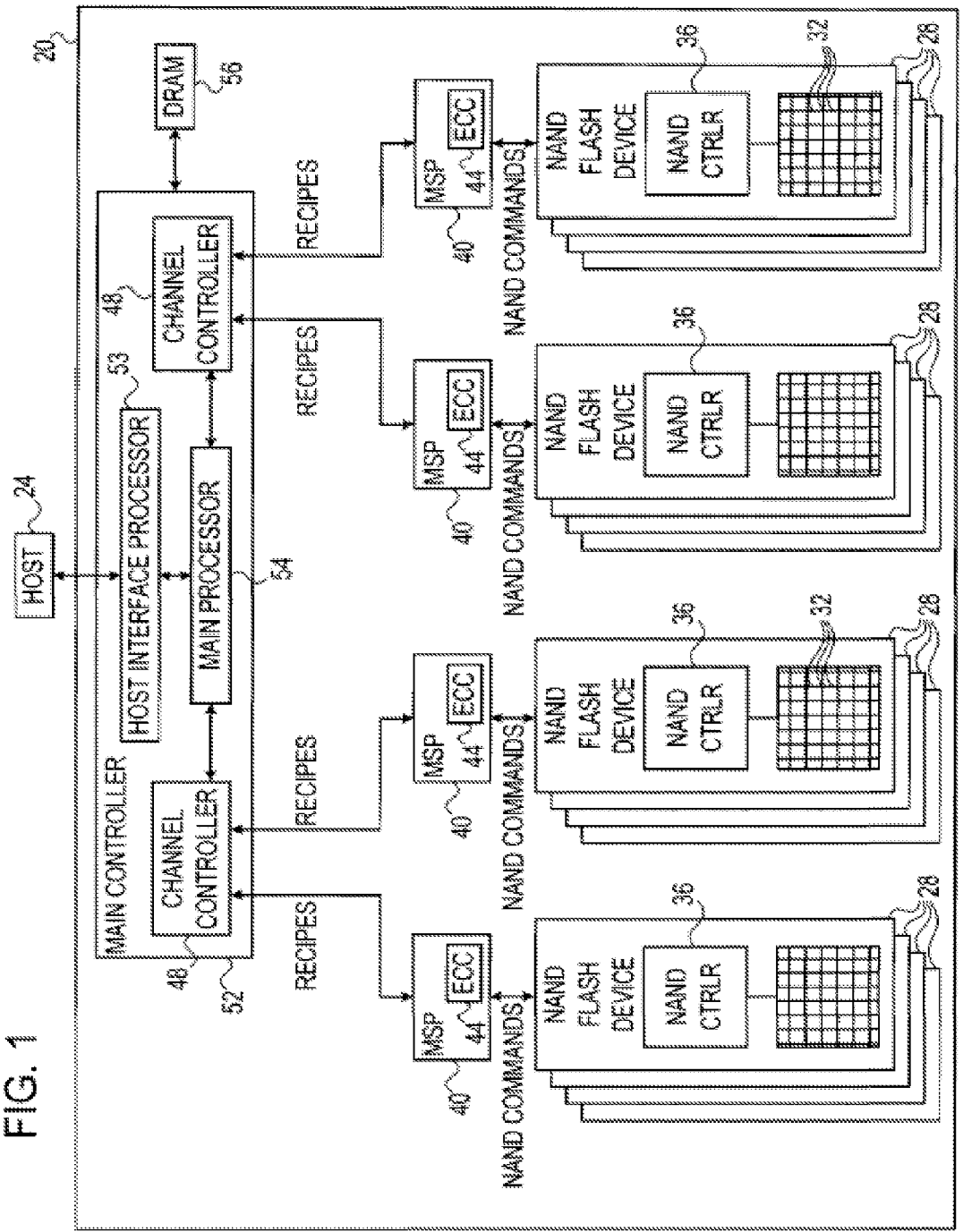
FIG. 1 is a block diagram that schematically illustrates a memory system, in accordance with an embodiment of the present invention.

Embodiments of the present invention that are described hereinbelow provide improved data storage systems and associated methods. The disclosed techniques store data in a plurality of non-volatile memory devices using a hierarchical configuration of processors, typically comprising multiple processors operating in parallel. In some embodiments, a memory system (e.g., a Solid State Disk—SSD) comprises a main controller and one or more processors. The non-volatile memory devices are arranged in one or more sets, and each processor is assigned to store data in the memory devices belonging to one of the sets.

The main controller receives data storage commands from a host, and converts the commands into recipes for execution by the processors. Each recipe comprises a list of multiple memory operations (e.g., page write and page read operations), to be performed sequentially in the memory devices belonging to one of the sets. Each processor receives one or more of the recipes from the main controller, and executes the memory operations specified in the received recipes in its respective set of non-volatile memory devices.

Various kinds of recipes can be defined and executed. Example recipes are recipes that write multiple pages in the non-volatile memory devices, recipes that read multiple pages from the non-volatile memory devices, recipes that erase certain memory areas and recipes that copy multiple pages from one location to another in the non-volatile memory devices. Several additional types of recipes are described herein. Typically although not necessarily, the memory operations in each recipe access multiple different pages. In a typical implementation, the host commands specify logical addresses, and the main controller converts the logical addresses into physical addresses when generating the recipes.

In some embodiments, each processor executes the recipes it receives from the main controller in an efficient manner, such as by optimizing the order in which the recipes are executed, identifying and eliminating superfluous memory operations in the recipes, and defining priorities among recipes or recipe types. Several example techniques are described herein.

The hierarchical system configurations described herein enable the main controller to operate at a high level of recipes, and relieve the main controller from direct management of the non-volatile memory devices. In some embodiments, the processors have considerable processing power and are capable of performing complex data storage operations, such as error detection and correction. In addition, the processors are typically autonomous in deciding when and how to execute the recipes they receive. As a result, the techniques described herein are highly scalable and can achieve high storage throughput and small latency. Moreover, the system configurations described herein are flexible and modular in adapting to different system needs and specifications. Using these configurations, a memory system can be dimensioned to match different system requirements with little or no modification to the individual system components.

System Description

FIG. 1 is a block diagram that schematically illustrates a multi-device memory system 20, in accordance with an embodiment of the present invention. System 20 accepts data for storage from a host 24 and stores it in memory, and retrieves data from memory and provides it to the host. In the present example, system comprises a Solid-State Disk (SSD) that stores data for a host computer. In alternative embodiments, however, system 20 may be used in any other suitable application and with any other suitable host, such as in computing devices, cellular phones or other communication terminals, removable memory modules such as Disk-On-Key (DOK) devices, Secure Digital (SD) cards, Multi-Media Cards (MMC) and embedded MMC (eMMC), digital cameras, music and other media players and/or any other system or device in which data is stored and retrieved.

System 20 comprises multiple non-volatile memory devices 28, each comprising multiple analog memory cells 32. In the present example, devices 28 comprise NAND Flash devices, although various other suitable solid state memory types, such as NOR and Charge Trap Flash (CTF) Flash cells, phase change RAM (PRAM, also referred to as Phase Change Memory—PCM), Nitride Read Only Memory (NROM), Ferroelectric RAM (FRAM), magnetic RAM (MRAM) and/or Dynamic RAM (DRAM) cells, can also be used.

In the context of the present patent application and in the claims, the term "analog memory cell" is used to describe any memory cell that holds a continuous, analog value of a physical parameter, such as an electrical voltage or charge. Any suitable type of analog memory cells, such as the types listed above, can be used. In the present example, each memory device 28 comprises a non-volatile memory of NAND Flash cells. The charge levels stored in the cells and/or the analog voltages or currents written into and read out of the cells are referred to herein collectively as analog values or storage values. Although the embodiments described herein mainly address threshold voltages, the methods and systems described herein may be used with any other suitable kind of storage values.

In each memory device 28, data is stored in memory cells 32 by programming the cells to assume respective memory states, which are also referred to as programming levels. The programming levels are selected from a finite set of possible levels, and each level corresponds to a certain nominal storage value. For example, a 2 bit/cell MLC can be programmed to assume one of four possible programming levels by writing one of four possible nominal storage values into the cell. Memory cells 32 are typically arranged in one or more memory arrays ("planes"), each comprising multiple rows and columns. The memory cells in each row are connected to a respective word line, and the memory cells in each column are connected to a respective bit line.

Each memory array is typically divided into multiple pages, i.e., groups of memory cells that are programmed and read simultaneously. Pages are sometimes sub-divided into sectors. In some embodiments, each page occupies an entire row of the array, i.e., an entire word line. For two-bit-per-cell devices, for example, each word line stores two pages. In alternative embodiments, each row (word line) can be divided into two or more pages. For example, in some devices each row is divided into two pages, one comprising the odd-order cells and the other comprising the even-order cells. In an example implementation, a two-bit-per-cell memory device may have four pages per row, a three-bit-per-cell memory device may have six pages per row, and a four-bit-per-cell memory device may have eight pages per row.

Typically, a given memory device comprises multiple erasure blocks (also referred to as memory blocks), i.e., groups of memory cells that are erased together. Each memory device 28 may comprise a packaged device or an unpackaged semiconductor chip or die. A typical SSD may comprise a number of 4 GB devices. Generally, however, system 20 may comprise any suitable number of memory devices of any desired type and size.

Each memory device 28 comprises an internal NAND controller 36, which stores data in the memory cells of the device. Each NAND controller 36 performs data storage and retrieval in its respective memory device in response to NAND commands. Each NAND command typically specifies writing or reading of a single memory page in the memory device. The interface with the NAND controllers may comprise, for example, the Open NAND Flash Interface Specification, revision 2.2, Oct. 7, 2009, which is incorporated herein by reference. Alternatively, NAND controllers 36 may be controlled using any other suitable standard or protocol.

In system 20, data storage in memory devices 28 is carried out by a hierarchical configuration of processors and controllers, whose operation is described in detail below. The disclosed schemes provide a high degree of parallelization of storage tasks, and therefore achieves high storage throughput with small latency.

Memory devices 28 in system 20 are arranged in subsets. A Memory Signal Processor (MSP) 40 is associated with each subset and performs data storage and retrieval in the subset. In some embodiments, each MSP 40 comprises an Error Correction Code (ECC) unit 44, which encodes the data for storage with a suitable ECC, and decodes the ECC of data retrieved from memory. In some embodiments, the subsets of memory devices 28 (each with its respective MSP) are aggregated into groups that are referred to as channels.

System 20 comprises a main controller 52, which manages the system operation. Main controller 52 comprises multiple channel controllers 48, each responsible for data storage and retrieval in a respective channel. The main controller accepts commands from host 24 to store and/or retrieve data, and communicates with the MSPs in order to carry out these commands. Typically, the communication between the main controller and the channel controllers, between the channel controllers and MSPs, and between the MSPs and the NAND controllers, comprise both data and control aspects.

In some embodiments, main controller 52 comprises a host interface processor 53 and a main processor 54. The host interface processor forwards host commands between main controller 54 and host 24, and forwards data between the MSPs and the host. Main processor 54 executes the host commands using the techniques described herein, performs Flash management functions on memory devices 28, and communicates with the MSPs. In alternative embodiments, any other suitable main controller configuration can also be used. For example, Flash management functions may be partitioned between main processor 54 and MSPs 40. In some embodiments, the system comprises volatile memory, in the present example one or more Dynamic Random Access Memory (DRAM) devices 56, connected to main controller 52. The role of DRAM 56 in the storage methods described herein is described in detail further below. In an embodiment, host interface controller 53 bridges data between the host and the DRAM.

In an example embodiment, system 20 comprises a total of eight channel controllers 48 and thirty-two MSPs 40, i.e., each channel controller manages four MSPs. In this configuration, each MSP may manage between one and eight memory devices 28. A given memory device 28 may comprise multiple dies. Alternatively, however, any other suitable numbers of channel controllers, MSPs and memory devices can also be used. The number of memory devices managed by each MSP may differ, for example, according to the storage capacity of system 20 and the storage density of devices 28. In some embodiments, the channel controllers may be omitted. In these embodiments, the main controller stores and retrieves data by communicating directly with the MSPs.

The functions of NAND controllers 36, MSPs 40, channel controllers 48 and main controller 52 may be implemented, for example, using software running on suitable Central Processing Units (CPUs), using hardware (e.g., state machines or other logic), or using a combination of software and hardware elements. In some embodiments, NAND controllers 36, MSPs 40, channel controllers 48 and/or main controller 52 may comprise general-purpose processors, which are programmed in software to carry out the functions described herein. The software may be downloaded to the processors in electronic form, over a network, for example, or it may, alternatively or additionally, be provided and/or stored on tangible media, such as magnetic, optical, or electronic memory.

The system configuration of FIG. 1 is an example configuration, which is shown purely for the sake of conceptual clarity. In alternative embodiments, any other suitable memory system configuration can also be used. Elements that are not necessary for understanding the principles of the present invention, such as various interfaces, addressing circuits, timing and sequencing circuits and debugging circuits, have been omitted from the figure for clarity.

In the exemplary system configuration shown in FIG. 1, the channel controllers are comprised in the main controller, and the main controller, MSPs and memory devices are implemented as separate Integrated Circuits (ICs). In an alternative embodiment, memory devices 28, MSPs 40, channel controllers 48 and main controller 52 may be implemented as separate ICs. Alternatively, each subset of devices 28 with its respective MSP, can be fabricated on a common die or device. Further alternatively, the MSPs, channel controllers and main controller may be fabricated in a common Multi-Chip Package (MCP) or System-on-Chip (SoC), separate from memory devices 28 and DRAM 56. In alternative embodiments, the elements of system 20 can be partitioned into packaged ICs or semiconductor dies in any other suitable way.

Further alternatively, some or all of the functionality of main controller 52 can be implemented in software and carried out by a processor or other element of the host system. In some embodiments, host 24 and main controller 52 may be fabricated on the same die, or on separate dies in the same device package. Although the embodiments described herein refer to multiple parallel processors (MSPs), the disclosed techniques can also be used in a system configuration comprising only a single MSP.

The hierarchical system configuration of FIG. 1 is flexible in adapting to different system needs and specifications. For example, different capacity requirements may require different numbers of MSPs and memory devices, but have little effect on the main controller. Different throughput requirements can be met by changing the number of MSPs, without necessarily modifying the main controller or memory devices. Host interface changes typically affect the main controller but not the MSPs or memory devices. Adaptation to different kinds of memory devices usually affects the MSPs but has little or no effect on the main controller. The MSPs typically share the main controller's resources (e.g., DRAM), and therefore changing the number of MSPs usually does not require changes in the main processor. As such, system 20 can be dimensioned or adapted to different needs or specifications in a modular fashion, with minimal modifications of individual system elements.

Recipe-Based MSP Operation

In system 20, main controller 52 receives commands from host 24 to store and retrieve data. The main controller carries out the host commands in a parallelized and efficient manner using the hierarchical structure of channel controllers 48 and MSPs 40. Main controller 52 translates the host commands into recipes, and provides the recipes to the MSPs for execution. Each recipe comprises a list of multiple memory operations, which are to be executed sequentially in a certain subset of memory devices 28. (As noted above, each subset of memory devices is controlled by a respective MSP.) The main controller sends to each MSP recipes, which specify memory operations that are to be applied to the memory devices in the subset managed by that MSP. Each MSP receives the recipes addressed thereto, and the MSPs execute their designated recipes concurrently.

Figure 2:
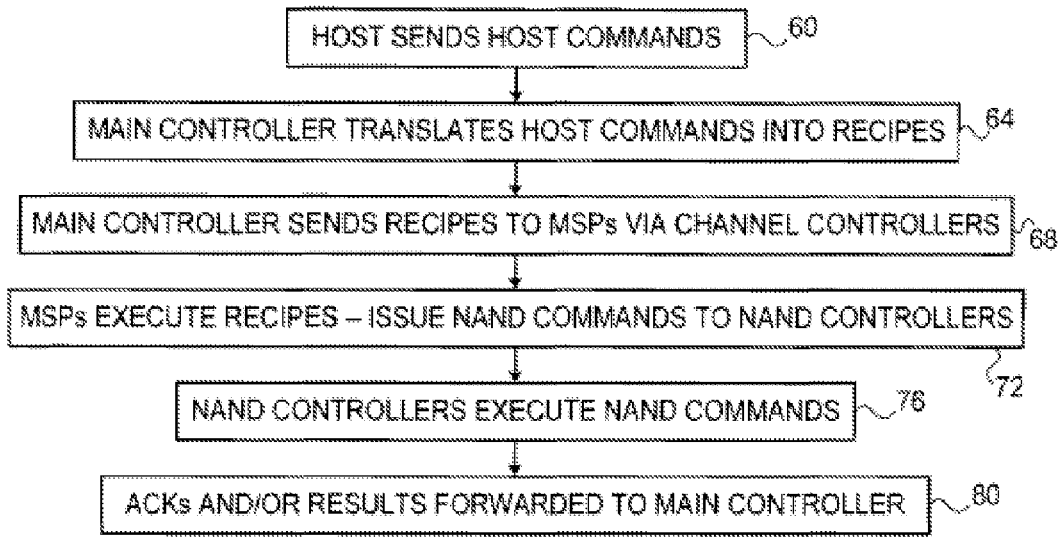
FIGS. 2-4 are flow charts that schematically illustrate methods for data storage, in accordance with embodiments of the present invention.

FIG. 2 is a flow chart that schematically illustrates a method for data storage, in accordance with an embodiment of the present invention. The method begins with host 24 sending host commands to main controller 52 of system 20, at a command input step 60. Main controller 52 translates the host commands into recipes, at a recipe generation step 64. The main controller sends the recipes to the MSPs via the channel controllers, at a recipe sending step 68. The MSPs execute the recipes, at a recipe execution step 72. Each MSP translates each of its recipes into a sequence of NAND commands, and issues the NAND commands to the appropriate memory devices 28. The memory devices accept and execute the NAND commands, at a NAND command execution step 76. In each memory device 28, NAND controller 36 accepts the NAND commands addressed thereto and executes them. Following execution of the NAND commands, results of the commands (e.g., retrieved data, acknowledgements of successful data storage and/or error messages) are forwarded from the memory devices back to the MSPs, channel controllers and/or main controller, at a result forwarding step 80.

Main controller 52 may generate various kinds of recipes for execution by the MSPs. Typically although not necessarily, the memory instructions in each recipe access multiple memory pages in memory devices 28. The term "access multiple pages" in the present context means, for example, write or read multiple memory pages. For example, a "multiple write" recipe instructs the MSP to write a body of data, typically comprising multiple pages, sequentially into a specified address range in memory devices 28. A "multiple read" recipe instructs the MSP to read a body of data, typically comprising multiple pages, sequentially from a specified address range in memory devices 28. A "multiple copy" recipe instructs the MSP to copy a body of data, typically comprising multiple pages, from a certain address range in memory devices 28 to another address range in the memory devices.

In some embodiments, the "multiple copy" recipe instructs the MSP to modify some of the read data or apply certain processing to the read data, before writing it to the destination address range. In some embodiments, the "multiple copy" recipe instructs the MSP to read the data from two or more different address ranges. This sort of recipe is useful, for example, for implementing "garbage collection" operations that collect the valid pages from two or more blocks and write them into another block.

Each of the above-described recipes instructs the MSP to read multiple pages and/or write multiple pages. Another example of recipe is a "multiple erase" recipe, which instructs the MSP to erase one or more memory areas, e.g., multiple erasure blocks. Several additional examples of recipes, which can be used in system 20, are described further below.

Typically, the commands received from host 24 specify data storage and readout using logical addresses. When translating the host commands into the recipes, main controller 52 translates the logical addresses into physical addresses, i.e., physical storage locations in memory devices 28. Any suitable logical-to-physical translation (often referred to as Logical Block Addressing—LBA) can be used. Thus, the recipes generated by the main controller specify the memory operations using physical addresses (e.g., block and page indices in memory devices 28). Typically, MSPs 40 operate according to the physical addresses, and the translation to and from logical addresses is performed at the main controller.

In some embodiments, main controller 52 stores information that is to be used by the recipes in DRAM 56 (or in other volatile memory). In these embodiments, the recipes specify that the appropriate information is to be read from the DRAM or written into the DRAM by the MSPs. For example, the "multiple write" recipe may specify that a body of data is to be read from a specified address range in DRAM 56 and stored in a specified address range in devices 28.

Typically, each MSP 40 operates as a master toward the memory devices it controls. In some embodiments, a given MSP may operate as a master toward the channel controller, as well. For example, the MSP may request data transfer services from the channel controller. In an example embodiment, when executing (or preparing to execute) a programming recipe, the MSP may send to the channel controller a request to send it data for programming from the main controller. In response to such a request, the channel controller typically retrieves the requested data from DRAM 56 of the main controller and sends the data to the MSP.

As another example, when executing a reading recipe, the MSP may request the channel controller to read the data (which was previously read from memory devices 28) from the MSP's buffers and send it to the main controller. In response to such a request, the channel controller typically reads the appropriate data from the MSP's buffers and sends the data to the main controller. Using these techniques, the channel controllers can relieve the MSPs and the main controller from some communication tasks, and the system can therefore operate more efficiently.

In some embodiments, a given host command is translated to multiple recipes executed by multiple MSPs. For example, when the host interface processor receives a read command from the host, the main processor may translate this command into multiple recipes, each instructing a certain MSP to read data from its designated memory devices. The MSPs execute their respective recipes and send the read data to the host interface processor. The host interface processor collects the data, orders it and sends it to the host. When all data is collected, the host interface processor sends a "command complete" indication to the host. In some embodiments, the host interface processor sends the "command complete" indication to the host as soon as all recipes corresponding to a given host command have been sent to the MSPs, without waiting for acknowledgements from the MSPs or for actual completion of recipe execution, for further improving performance.

Recipe Processing in the MSP

Typically, each MSP 40 is autonomous in deciding when and how it will execute the recipes received from the channel controller. This autonomy enables the MSPs to execute the recipes in an efficient manner. For example, a given MSP may control and modify the order in which it executes the recipes received from the channel controller. In other words, the MSP does not necessarily execute the recipes in the same order they are received from the channel controller.

The MSP may set the recipe execution order based on various criteria. For example, the MSP may set the recipe execution order to optimize the utilization of system resources, e.g., bus utilization, utilization of logic units such as the ECC encoder and/or decoder or error detection circuitry in unit 44, or utilization of different memory devices 28. As another example, the MSP may modify the recipe execution order in a way that consolidates multiple random read (or random write) operations into a single sequential read (or write) operation. This technique utilizes the memory devices and their interfaces more efficiently. As yet another example, the MSP may modify the recipe execution order in a way that reduces peak power consumption. Additionally or alternatively, the MSP may set the execution order of the recipes based on any other suitable criterion. In some embodiments, the MSP modifies the order in which pages are programmed or read within a given recipe. Page re-ordering of this sort sometimes assists in reducing interference between memory cells. For example, in some memory devices, data is programmed using an iterative Programming and Verification (P&V) process. In a typical P&V process, the memory device circuitry applies a sequence of programming pulses to the memory cells in a given word line, and verifies the threshold voltages of the cells after each pulse. Programming continues for those cells that have not yet reached their intended threshold voltages.

When programming a memory device word line by word line, the P&V process inherently compensates for interference caused to the present word line by previously-programmed word lines. The P&V process typically cannot compensate for interference from word lines that are programmed later. Thus, in some scenarios it is advantageous to read data in reverse order to the order in which it was programmed. For example, if the data was programmed into the memory device in ascending order of word lines, it may be advantageous to read the data is descending order of word lines, and vice versa. In some embodiments, the MSP sets the order in which pages are read to be the inverse of the order in which the pages were written.

In some embodiments, the MSP applies an interference cancellation process that cancels the interference in a given word line based on the threshold voltages or data of neighboring word lines. Interference cancellation techniques are described, for example, in PCT International Publications WO 2007/132453, 2007/132457 and 2008/026203, whose disclosures are incorporated herein by reference. In these embodiments, the MSP may set the order in which pages are read in a given recipe, so that pages that potentially cause interference to a given page are read adjacently to the interfered page. This technique enables the interference cancellation process to use smaller buffers, and/or to apply interference cancellation using a larger number of neighboring word lines. Alternatively, the MSP may modify the order in which pages are programmed or read in a given recipe based on any other suitable criterion.

In some embodiments, the MSP may eliminate some of the read or write operations specified in recipes by considering multiple recipes jointly. For example, if the MSP identifies two or more write operations to the same physical address in different recipes, it may execute only the latest write operation and discard the others. As another example, if the MSP identifies two or more read operations from the same physical address in different recipes, it may execute only the earliest read operation and discard the others. As yet another example, the MSP may detect a program operation that writes data to a certain physical address in one recipe, and a later read operation that reads the data from the same physical address in another recipe. In such a case, the MSP may read the data from its internal buffers instead of reading it from memory devices 28. Additionally or alternatively, the MSP may decide to eliminate read and/or write operations when executing the recipes, based on any other suitable logic. These techniques enable the MSP to avoid superfluous or unnecessary access to memory devices 28, and therefore improve system performance.

Additionally or alternatively, different recipes or recipe types may be assigned different priorities, and the MSPs may execute the recipes according to their priorities. For example, an MSP may be in the process of executing a certain recipe, when another recipe is received from the main controller. If the priority of the newly-arriving recipe is higher than the priority of the currently-executed recipe, the MSP may temporarily suspend execution of the currently-executed recipe, execute the higher-priority recipe, and then resume execution of the suspended recipe. This technique can be used, for example, by assigning a relatively low priority to recipes having long execution times. Shorter recipes can be assigned higher priorities, and thus need not suffer long delays.

Additional Recipe Types

In some embodiments, the main controller may send a "merge and write" recipe that requests the MSP to write data into a specified address range in memory devices 28. In the "merge and write" recipe, part of the data resides in a certain address range in DRAM 56, while another part of the data resides in a certain address range in memory devices 28. The "merge and write" recipe can be used, for example, to copy a body of data from one location to another in memory devices 28, while replacing part of the data with data provided by the main controller.

Figure 3:
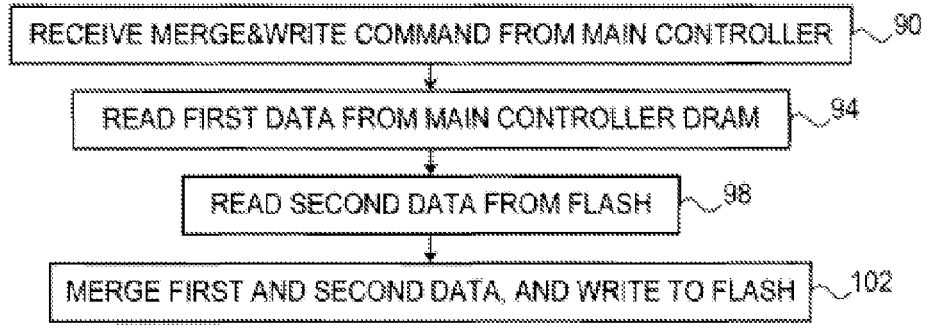

FIG. 3 is a flow chart that schematically illustrates a method for data storage, in accordance with an embodiment of the present invention. The method begins with MSP 40 receiving a "merge and write" recipe from main controller 52, at a merge and write input step 90. The recipe typically specifies (1) an address range in DRAM 56 in which a first part of the data is stored, (2) an address range in memory devices 28 in which a second part of the data is stored, and (3) an address range in memory devices 28 in which the merged data is to be stored. The MSP reads the first part of the data from DRAM 56, typically using the channel controller services, at a first readout step 94. The MSP reads the second part of the data from memory devices 28, at a second readout step 98. The MSP them merges the first and second parts, and writes the merged data to memory devices 28, at a merge and write output step 102.

The description of FIG. 3 assumes that the internal memory of MSP 40 is sufficient for holding both parts of the data in order to perform the merging operation. This assumption typically holds for small data sizes, e.g., when reading a page from memory devices 28, and replacing a sector in this page with data from DRAM 56. When the total size of the first and second data parts exceeds the internal storage capacity of MSP 40, the MSP may store the data temporarily in DRAM 56 and perform the merging operation using the DRAM.

In some embodiments, the main controller generates an "indirect read" recipe. The "indirect read" recipe specifies a physical address, whose content indicates (e.g., points to) the address from which data is to be retrieved. In other words, the "indirect read" recipe instructs the MSP to perform the following:

Read a physical address X specified in the recipe.

Decode the data read from physical address X, and use the decoded data as another physical address Y.

Read physical address Y, and return the data read from physical address Y as the recipe output.

The "indirect read" recipe is an example of a recipe in which the MSP decodes the retrieved data and uses this data in order to configure the operations in the recipe. In alternative embodiments, other types of recipes may modify the recipe operation based on the read data in any other suitable way.

Efficient Recipe Execution Using Main Controller DRAM

In some embodiments, MSPs 40 use DRAM 56 as an external memory resource when executing recipes. Typically, the available memory space in DRAM 56 is considerably larger than the internal memory of the MSP, and using the DRAM enables the MSPs to execute recipes more efficiently. Consider, for example, a "multiple copy" recipe that instructs a given MSP to copy N pages from one location to another in memory devices 28. In the present example, the MSP is able to buffer internally only up to K pages, K<N.

It is possible in principle for the MSP to read a group of K pages at a time, and write it to its destination before reading the next group. Alternatively, however, the MSP can read all N pages sequentially and store them in DRAM 56. Then, the MSP can program the N pages sequentially from the DRAM to their destination in memory devices 28. Reading and writing all N pages sequentially is considerably more efficient, for example since it enables to MSP to operate in a pipeline and use the memory devices' cache commands. Thus, the copying speed is increased.

Some host commands involve transferring large amounts of data from DRAM 56 to memory devices 28. The data may be addressed to multiple memory devices and MSP, and therefore often involves generation and execution of multiple recipes. Executing such commands may result in considerable computation and communication load on the main controller. In some embodiments, system 20 relieves most of this computation and communication load by transferring more functions to the channel controllers and MSPs.

For example, in some embodiments the main controller formats data for storage as a linked list of data items, referred to as cache lines. Each cache line is stored in a certain location in DRAM 56. Each cache line holds a portion of the data, and a pointer to the location in DRAM 56 of the next cache line. In order to store the data, the main controller sends to a given MSP a program recipe which comprises a pointer to the first cache line in the list. Note that no data is typically transferred in this recipe, only the pointer.

Upon receiving this recipe, the MSP requests the channel controller to prepare the first cache line. The channel controller reads the requested cache line from the DRAM and sends it to the MSP. The MSP stores the data from the cache line in memory devices 28. In addition, the MSP extracts the pointer to the next cache line from the present cache line data, and uses this pointer to request the channel controller to prepare the next cache line. The process continues until the entire list of cache lines has been transferred from DRAM 56 to memory devices 28. When storage is completed, the MSP issues a "program complete" notification. As can be appreciated, most of the processing load in this process is shifted to the MSP and channel controller.

In alternative embodiments, the MSP can store any other suitable data in DRAM 56, as part of the recipe execution. Typically, the recipes produced by main controller 52 instruct the MSPs as to how to use the DRAM.

Recipe Execution Using Memory Cell Properties Stored in DRAM

In some embodiments, main controller 52 stores in DRAM 56 certain properties of groups of memory cells 32, e.g., of erasure blocks or even individual word lines. MSPs 40 may use the information stored in DRAM 56 when executing recipes. In some embodiments, the main controller indicates the memory cell properties as part of the recipe. Alternatively, the MSP may query the information stored in the DRAM when executing the recipe.

For example, memory devices 28 may program the memory cells using a P&V process, as described above. In a typical P&V process, the cell threshold voltages are compared with certain Programming Verification (PV) levels, which indicate the desired threshold voltages corresponding to the different programming states. The optimal PV levels may differ from one group of memory cells to another, and/or vary over time, for various reasons. In some embodiments, main controller 52 stores the desired PV levels to be used with different cell groups (e.g., PV levels for each erasure block) in DRAM 56. When the main controller generates a recipe for programming data in a certain cell group, the main controller may indicate the PV levels to be used in programming the cell group in question. The recipe format may include a field dedicated for this purpose. When executing such a recipe, the MSP instructs the NAND controller to apply the PV levels specified in the recipe.

As another example, data is typically read from analog memory cells by comparing the cells' threshold voltages to certain read thresholds. The optimal read threshold values may vary over time, and/or between one cell group to another, for various reasons. In some embodiments, the main controller stores the read threshold values to be used for reading different cell groups (e.g., read thresholds for each erasure block) in DRAM 56. When the main controller generates a recipe for reading data from a certain cell group, the main controller may indicate the read thresholds to be used in programming the cell group in question. The recipe format may include a field dedicated for this purpose. When executing such a recipe, the MSP instructs the NAND controller to apply the read thresholds specified in the recipe.

In some embodiments, the optimal read threshold values are calculated by the MSPs and provided to the main controller for storage in the DRAM. Any suitable method for calculating read thresholds can be used. Example methods are described in PCT International Publication WO 2007/132457, cited above, and PCT International Publications WO 2008/111058 and 2008/053472, whose disclosures are incorporated herein by reference. The main controller may send a given MSP a "read threshold acquisition" recipe, which contains a list of memory operations that determine the optimal read thresholds in a given block or other cell group.

Other examples of properties of memory cell groups that can be stored in DRAM 56 comprise the endurance of the cell group (e.g., the number of programming and erasure cycles the cell group has gone through), the time that elapsed since the last programming of the cell group, the estimated read disturb (or other interference) in the cell group, an integral of the cell group temperature over time (which is a measure of the cell group's wear level), and/or any other suitable property. Any of these properties can be reported to the MSPs as part of the recipes, and the MSPs can configure the readout or programming operations in any suitable way based on the reported properties.

Figure 4:
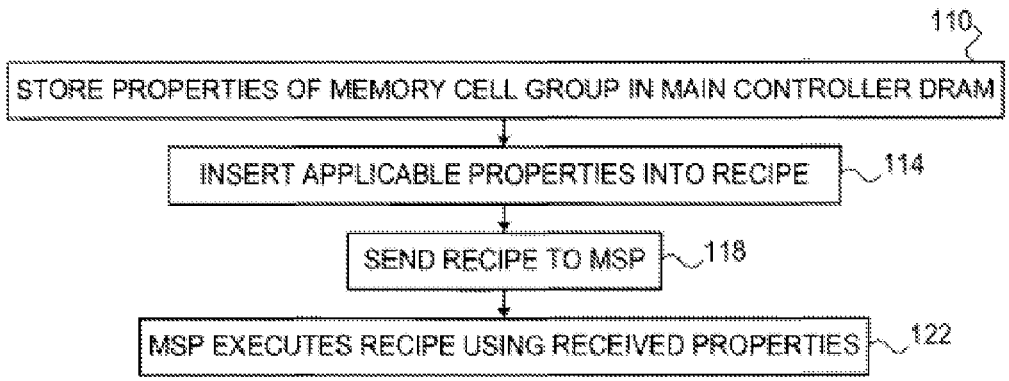

FIG. 4 is a flow chart that schematically illustrates a method for data storage, in accordance with an embodiment of the present invention. The method begins with main controller 52 storing properties of different groups of memory cells, at a property storage step 110. When generating a recipe to be applied to a certain group of memory cells, the main controller inserts the properties of the cell group in question into the recipe, at a property specification step 114. The main controller sends the recipe, including the specified properties, to one of the MSPs, at a recipe forwarding step 118. The MSP executes the recipe based on the memory cell group properties reported in the recipe, at an execution step 122.

Additional Variations and Embodiments

As noted above, main controller 52 typically translates the logical addresses specified in the host commands into physical addresses, and uses the physical addresses when generating the recipes. In some embodiments, system 20 uses this translation to ensure that the correct data in memory devices 28 is being accessed. In an example embodiment, at least some of the recipes comprise a field in which the main controller indicates the logical address of the data. When programming data (e.g., a block) in memory devices 28, the MSP stores the logical address indicated in the "write" recipe together with the data. When requesting to read the data, the main controller indicates the logical address of the data as part of the "read" recipe. In response to the "read" recipe, the MSP reads the data, extracts the logical address from the read data, and compares the extracted logical address with the logical address indicated in the "read" recipe. If the stored logical address does not match the logical address indicated in the "read" recipe, the MSP issues an error message.

In some embodiments, MSPs 40 copy memory pages from one location to another in memory devices 28 during operation of system 20. These copy operations may comprise, for example, "garbage collection" operations in which the MSP copies valid pages from one block to another in order to free sparsely-programmed blocks for erasure. As noted above, the main controller typically holds a logical-to-physical address mapping, for translating the logical addresses specified by the host into physical addresses in memory devices 28.

When performing the above-described copy operations by the MSPs, the logical-to-physical address mapping in the main controller should be updated to reflect the updated physical locations of the copied data. This task is often complex, since the logical-to-physical address mapping typically comprises a very large number of entries, and the main controller has no straightforward way of determining which logical addresses should be mapped to new physical locations.

As noted above, the MSP stores the logical address indicated in the "write" recipe together with the data in memory devices 28. In some embodiments, system 20 uses this information to update the logical-to-physical address mapping in an efficient manner. In an example process, the MSP receives a recipe that instructs it to copy data from certain source physical addresses to respective destination physical addresses. When copying a given page, the MSP extracts and records the logical address corresponding to this page (which has been stored together with the data by the "write" recipe"). After completing the copy recipe, the MSP sends to the main controller a list of the logical addresses that were subjected to the copy operations, and the respective new physical addresses to which the logical addresses should now correspond. The main controller updates its logical-to-physical address mapping based on this information. Using this technique, the main controller need not search or otherwise determine which logical addresses were affected by the copy operations, since the logical addresses are provided explicitly be the MSPs.

As noted above, the main controller may hold in DRAM a data structure that records the optimal read threshold values for different groups of memory cells (e.g., for different blocks). The main controller and/or MSPs may manage and update this information during system operation in any suitable way. In some embodiments, the read thresholds of a certain block can be adjusted during each read operation from the block. In an embodiment, whenever the MSP reads a certain word line from a given block, it updates the main controller with the read thresholds that were found to be optimal in that read operation. The main controller updates the data structure in DRAM 56 accordingly. Thus, when the MSP will encounter another read operation from the same block in the future, it can perform the readout using the read thresholds that were previously found to be optimal for the block. This technique assumes that the differences in read threshold values between different word lines in a block are relatively small (or that the differences can be compensated for using other means).

Additionally or alternatively, when the MSP calculates an initial estimate of the read thresholds with no prior information, or using read thresholds that highly non-optimal, it reports the read thresholds found to be optimal to the main controller. The main controller updates the data structure in DRAM 56 accordingly. Acquisition may be performed for a given word line in a block. This technique is useful, for example, when large differences exist in the read threshold values between different word lines in the block. In some embodiments, the main controller or MSP may initiate an acquisition process for blocks for which no read threshold information exists in the data structure. These acquisition attempts may be performed, for example, during idle times of the system. This technique increases the likelihood of finding up-to-date read threshold information regarding a given block in the data structure.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

Figure 5:
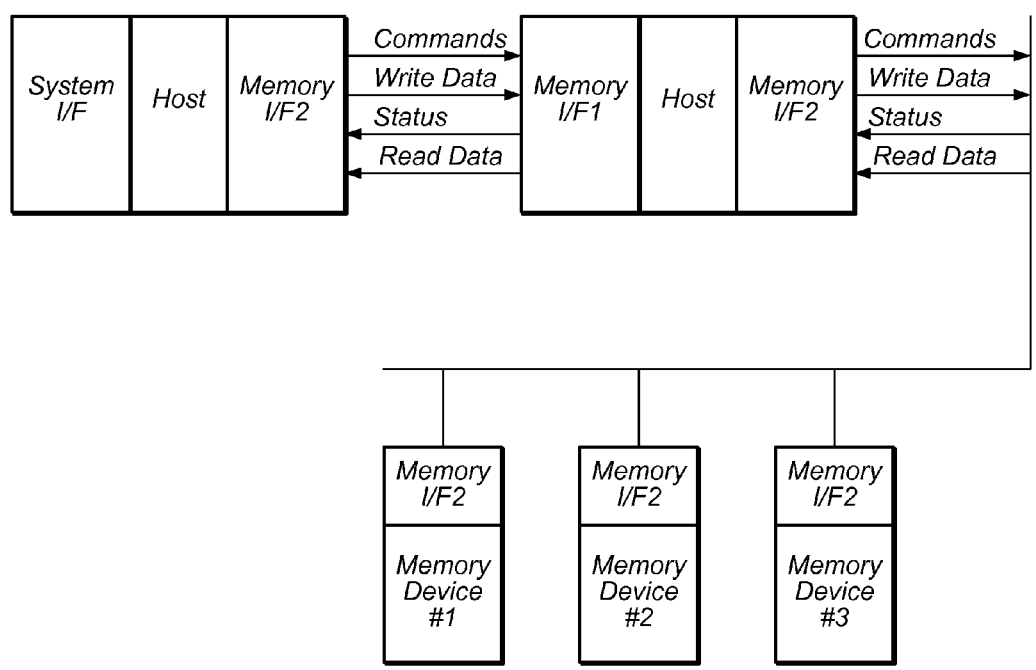
FIG. 5 illustrates an embodiment of computing system.

Refer to the system described in FIG. 5. A Memory Controller is connected to N Memory devices. The Memory Controller is connected to a Host that controls the system. The Host has more memory resources, as it is connected to an external DRAM.

An example for such a system is a Cellular Phone, where the Host is the processor that controls the system and the Memory Controller is an eMMC/SD controller that implements the storage functionality. In this example, the eMMC/SD controller has limited memory resources, whereas the Host has a large amount of DRAM.

Generally, there can be a few Memory Controllers connected to one Host. The Memory Controller can reside on the same die of the Memory Device, on the same die as the Host, on a different die, that reside in the same Multi-Chip Package (MCP), or on different packages. It is also possible that all entities reside on the same die.

In the proposed method, the Memory Controller stores and retrieves data that is required for its functionality to/from the DRAM connected to the Host. The Host and the Memory Controller are connected via so called Memory I/F 2. Examples for such interfaces are: NAND I/F, uSD I/F, eMMC I/F, UFS I/F, SATA I/F, USB I/F. Usually the Host is the Master, while the Memory Controller is the slave. As a result, the Memory Controller cannot send commands to the Host, asking to store or retrieve data. Therefore, it is suggested that the Memory Controller will use a signal, for example, the ready/busy signal line in the NAND I/F, to indicated the Host it requires to store/retrieve data.

Whenever the Host sends a read or write command to the Memory Controller, it also includes Meta-Data, to exchange data between the two components.

The host may store the parameters required by the Memory Controller in the DRAM. For example, every time the Memory Controller performs page read, it transfers to the host the read thresholds besides the data. The Host stores the read thresholds in its DRAM. When the host instructs the Memory Controller to read, it also transfers the read thresholds. This enables faster operation of the Memory Controller.

The invention claimed is:

1. A data storage system, comprising:
a host coupled to a volatile system memory;
a plurality of non-volatile memory devices arranged in one or more sets, wherein each non-volatile memory device of the plurality of non-volatile memory devices includes multiple analog memory cells arranged in groups;
a main controller configured to:
 accept commands from the host;
 signal the host to retrieve and send to the main controller information items stored in the volatile system memory relating to respective groups of the analog memory cells, responsive to the acceptance of the commands;
 receive, from the host, the information items; and
 generate recipes dependent upon the received information items, wherein each recipe includes a list of multiple memory operations to be performed sequentially in one or more of the plurality of non-volatile memory devices belonging to one of the sets; and
one or more processors, wherein each of the one or more processors is associated with a respective set of one or more of the plurality of non-volatile memory devices and is configured to:
 receive one or more of the recipes from the main controller;
 assign a priority to each recipe of the one or more recipes dependent upon execution times of each recipe of the one or more recipes; and
 cause execution of memory operations that comprise the one or more recipes dependent upon the priority assigned to each recipe of the one or more recipes;
 wherein the execution of the memory operations occurs in the one or more of the plurality of non-volatile memory devices belonging to the respective set for that processor.

2. The system according to claim 1, wherein the memory operations comprising each recipe access multiple memory pages in the plurality of non-volatile memory devices upon execution.

3. The system according to claim 1, wherein the main controller is configured to generate a recipe that instructs a given one of the one or more processors to perform at least one action selected from a group of actions comprising reading multiple pages from the plurality of non-volatile memory devices, writing multiple pages in the plurality of non-volatile memory devices, and erasing one or more memory areas in the plurality of non-volatile memory devices.

4. The system according to claim 1, wherein the main controller is configured to generate a recipe that instructs a given one of the one or more processors to copy multiple pages from one or more first locations in the plurality of non-volatile memory devices to a second location in the plurality of non-volatile memory devices.

5. The system according to claim 4, wherein the recipe instructs the given one of the one or more processors to modify at least one of the pages read from the first locations and to write the modified pages to the second location.

6. The system according to claim 1, wherein the main controller is configured to generate a recipe that instructs a given one of the one or more processors to:
 read first data from a first location in the plurality of non-volatile memory devices;
 use the first data as an address pointing to a second location in the plurality of non-volatile memory devices; and
 read second data from the second location using the address.

7. The system according to claim 1, wherein each of the one or more processors is configured to send to the main controller a request for exchanging data between that processor and the main controller, and wherein the main controller is configured to exchange the data with that processor responsively to the request.

8. The system according to claim 1, wherein the commands accepted from the host specify logical addresses, and wherein the main controller is configured to translate the logical addresses into respective physical storage locations in the plurality of non-volatile memory devices and is configured to specify the physical storage locations in the recipes.

9. The system according to claim 8, wherein each one of the one or more processors is configured to:
 store in the plurality of non-volatile memory devices given data and a logical address corresponding to the given data;
 receive a recipe instructing that processor to retrieve the given data from the plurality of non-volatile memory devices, wherein the recipe indicates the logical address;
 read the given data and the logical address from the plurality non-volatile memory devices; and
 detect an error condition corresponding to a mismatch between the logical address indicated in the recipe and the logical address read from the plurality of non-volatile memory devices.

10. The system according to claim 1, wherein the main controller is configured to assign respective priorities to the recipes, and wherein each of the one or more processors is configured to execute the recipes in accordance with the priorities.

11. The system according to claim 1, wherein each of the one or more processors is configured to receive two or more of the recipes in a first order, and is configured to execute the recipes in a second order different from the first order.

12. The system according to claim 1, wherein each of the one or more processors is configured to:
 identify that a first recipe comprises a first write operation addressed to a given location in the plurality of non-volatile memory devices;

identify that a second recipe comprises a second write operation that is subsequent to the first write operation, wherein the second write operation is addressed to-the given location in the plurality of non-volatile memory devices; and inhibit execution of the first write operation.

13. The system according to claim 1, wherein each of the one or more processors is configured to:

identify that a first recipe comprises a first read operation addressed to a given location in the plurality of non-volatile memory devices;

identify that a second recipe comprises a second read operation that is subsequent to the first read operation, wherein the read operation comprises an address to the given location in the plurality of non-volatile memory devices; and inhibit execution of the second read operation.

14. The system according to claim 1, wherein each of the one or more processors is configured to:

identify that a first recipe comprises a write operation that writes a value to a given location in the plurality of non-volatile memory devices;

identify that a second recipe comprises a read operation that is addressed to the given location and is subsequent to the first write operation; and execute the read operation using an internally-buffered version of the value obtained from the write operation, without applying the read operation to the plurality of non-volatile memory devices.

15. The system according to claim 1, wherein the one or more processors are configured to extract the information items from the recipe addressing a given group and cause execution, in the plurality of non-volatile memory devices, of memory operations specified in the recipe responsive to the extracted value.

16. The system according to claim 1, wherein the information items comprises at least one property type selected from a group of types comprising: Programming and Verification (PV) levels used in programming the memory cells, read thresholds used in reading the memory cells, endurance measures of the memory cells, elapsed times since latest programming of the memory cells, estimates of read disturb in the memory cells, and time-temperature integral values computed over the memory cells.

17. The system according to claim 1, wherein the main controller is configured to convert a given host command to a set of one or more recipes and send a command completion indication to the host after sending the set of the recipes to the one or more processors, irrespective of execution of the recipes in the set.

18. The system according to claim 1, further comprising a volatile memory coupled to the main controller, wherein the main controller is configured to:

store in the volatile memory a linked list of data items representing data, each data item comprising a portion of the data and a pointer to a next data item on the list; and generate a recipe that instructs a given one of the one or more processors to store the data in the plurality of non-volatile memory devices and points to a first data item on the linked list of data items.

19. A method for data storage, comprising:

accepting commands from a host at a main controller, wherein the commands relate to data storage in a plurality of non-volatile memory devices arranged in one or more sets;

wherein the plurality of non-volatile memory devices include multiple analog memory cells arranged in groups;

signaling, by the main controller, to the host to retrieve information items relating to the groups of analog memory cells from a volatile system memory and send the information items to the main controller;

receiving, by the main controller, the information items;

converting, by the main controller, the commands into recipes dependent upon the received information items, wherein each recipe includes a list of multiple memory operations to be performed sequentially in one or more of the plurality of non-volatile memory devices belonging to one of the sets;

receiving, by at least one processor of one or more processors, the one or more recipes wherein each of the one or more processors is associated with a respective set of the plurality of non-volatile memory devices;

assigning, by the at least one processor of the one or more processors, a priority to each recipe of the one or more recipes dependent upon a respective execution time of each recipe of the one or more recipes;

executing, by the at least one processor of the one or more processors, memory operations specified in the one or more of the recipes in the plurality of non-volatile memory devices belonging to the respective set for the at least one processor dependent upon the priority assigned to each recipe of the one or more recipes.

20. The method according to claim 19, wherein the memory operations specified in each recipe access multiple memory pages in the plurality of non-volatile memory devices upon execution.

21. The method according to claim 19, wherein converting the commands into the recipes comprises generating a recipe that instructs a given one of the one or more processors to perform at least one action selected from a group of actions comprising: reading multiple pages from the plurality of non-volatile memory devices, writing multiple pages in the plurality of non-volatile memory devices, and erasing one or more memory areas in the plurality of non-volatile memory devices.

22. The method according to claim 19, wherein converting the commands into the recipes comprises generating a recipe that instructs a given one of the one or more processors to copy multiple pages from one or more first locations in the plurality of non-volatile memory devices to a second location in the plurality of non-volatile memory devices.

23. The method according to claim 22, wherein the recipe instructs the given one of the one or more processors to modify at least one of the pages read from the first locations and to write the modified pages to the second location.

24. The method according to claim 19, wherein converting the commands into the recipes comprises generating a recipe that instructs a given one of the one or more processors to:

read first data from a first location in the plurality of non-volatile memory devices;

use the first data as an address pointing to a second location in the plurality of non-volatile memory devices; and read second data from the second location using the address.

25. The method according to claim 19, wherein the commands accepted from the host specify logical addresses, and wherein converting the commands into the recipes comprises translating the logical addresses into respective physical storage locations in the plurality of non-volatile memory devices.

26. The method according to claim 25, wherein executing the one or more of the recipes comprises:
- storing in the plurality of non-volatile memory devices given data and a logical address corresponding to the given data;
- in association with copying the given data to an alternative physical storage location in the plurality of non-volatile memory devices, reading the logical address of the given data from the plurality of non-volatile memory devices and determining that the read logical address is associated with the alternative physical storage location.

27. The method according to claim 19, wherein converting the commands into the recipes comprises assigning respective priorities to the recipes and wherein executing the one or more of the recipes comprises executing the one or more of the recipes in accordance with their respective priorities.

28. The method according to claim 19, wherein executing the one or more of the recipes comprises receiving two or more of the recipes in a first order and executing the recipes in a second order, different from the first order.

29. The method according to claim 19, wherein executing the one or more of the recipes comprises:
- identifying that a first recipe comprises a first write operation addressed to a given location in the plurality of non-volatile memory devices;
- identifying that a second recipe comprises a second write operation that is subsequent to the first write operation, wherein the second write operation comprises an address of the given location in the plurality of non-volatile memory devices; and
- inhibiting execution of the first write operation.

30. The method according to claim 19, wherein executing the one or more of the recipes comprises:
- identifying that a first recipe comprises a first read operation addressed to a given location in the plurality of non-volatile memory devices;
- identifying that a second recipe comprises a second read operation that is subsequent to the first read operation, wherein the second read operation comprises an address of the given location in the plurality of non-volatile memory devices; and
- inhibiting execution of the second read operation.

31. The method according to claim 19, wherein the information items comprise at least one of: Programming and Verification (PV) levels used in programming the memory cells, read thresholds used in reading the memory cells, endurance measures of the memory cells, elapsed times since latest programming of the memory cells, estimates of read disturb in the memory cells, and time-temperature integral values computed over the memory cells.

32. The method according to claim 19, further comprising storing one or more read threshold values applicable to each of one or more of the groups and updating the one or more read threshold values.

33. The method according to claim 19, wherein converting the commands into the recipes comprises converting a given host command to a set of one or more recipes and sending a command completion indication to the host after sending the set of the one or more recipes to the one or more processors, irrespective of execution of the recipes in the set.

34. The method according to claim 19, wherein converting the commands into the recipes comprises storing in volatile memory a linked list of data items representing data, each data item comprising a portion of the data and a pointer to a next data item on the list, and generating a recipe that instructs a given one of the one or more processors to store the data in the plurality of non-volatile memory devices and points to a first data item on the linked list of data items.

* * * * *